(12) United States Patent
Terry et al.

(10) Patent No.: US 6,863,137 B2
(45) Date of Patent: Mar. 8, 2005

(54) WELL SYSTEM

(75) Inventors: James B. Terry, Houston, TX (US); Thomas Platt Wilson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/911,963

(22) Filed: Jul. 23, 2001

(65) Prior Publication Data

US 2002/0007970 A1 Jan. 24, 2002

Related U.S. Application Data

(63) Continuation of application No. 09/081,961, filed on May 20, 1998, now Pat. No. 6,296,066.
(60) Provisional application No. 60/063,326, filed on Oct. 27, 1997.

(51) Int. Cl.[7] .............................. E21B 4/00; E21B 17/00
(52) U.S. Cl. ........................... 175/92; 175/73; 175/320; 166/242.2; 138/125
(58) Field of Search .............................. 175/73, 92, 99, 175/320; 166/242.2, 242.6; 138/103, 108, 125, 130, 132, 133, 137, 144, 153, 174; 174/47, 69

(56) References Cited

U.S. PATENT DOCUMENTS

| | | | |
|---|---|---|---|
| 2,822,158 A | 2/1958 | Brinton | 262/3 |
| 3,129,776 A | 4/1964 | Mann | 175/76 |
| 3,225,843 A | 12/1965 | Ortloff et al. | 175/93 |
| 3,354,969 A | 11/1967 | Ebeling | 175/81 |
| 3,376,942 A | 4/1968 | Van Winkle | 175/81 |
| 3,797,589 A | 3/1974 | Kellner et al. | 175/94 |
| RE28,449 E | 6/1975 | Edmond | 175/94 |
| 3,978,930 A | 9/1976 | Schroeder | 175/94 |

(List continued on next page.)

FOREIGN PATENT DOCUMENTS

| | | | | |
|---|---|---|---|---|
| GB | 2067260 | * | 7/1981 | .................. 138/125 |
| GB | 2 295 875 A | | 6/1996 | ............ F16L/11/02 |
| WO | WO 96/09416 | | 3/1996 | ........... E21B/47/01 |
| WO | 9708418 | | 3/1997 | |
| WO | WO 97/12115 | | 4/1997 | ........... E21B/17/04 |
| WO | WO 97/12166 | | 4/1997 | ............ F16L/11/08 |
| WO | WO 99/19653 | | 4/1999 | ............ F16L/11/12 |

OTHER PUBLICATIONS

Patent Office of the People's Republic of China Office Action for Appln. No. 98 1 23545.X dated Apr. 26, 2003 (English Translation (5 p.).

(List continued on next page.)

Primary Examiner—Jong-Suk (James) Lee
(74) Attorney, Agent, or Firm—Conley Rose, P.C.

(57) ABSTRACT

A drilling system includes a work string supporting a bottom hole assembly. The work string including lengths of pipe having a non-metallic portion. The work string preferably includes a composite umbilical having a fluid impermeable liner, multiple load carrying layers, and a wear layer. Multiple electrical conductors and data transmission conductors are embedded in the load carrying layers for carrying current or transmitting data between the bottom hole assembly and the surface. The bottom hole assembly includes a bit, a gamma ray and inclinometer instrument package, a propulsion system with resistivity antenna and steerable assembly, an electronics section, a transmission, and a power section for rotating the bit. The electrical conductors in the composite umbilical provide power to the electronics section and may provide power to the power section. The data transmission conduits in the composite umbilical transmit the data from the downhole sensors to the surface where the data is processed. The propulsion system includes two or more traction modules connected by rams disposed in cylinders for walking the bottom hole assembly up and down the borehole. The propulsion system includes a steerable assembly, controlled from the surface, for changing the trajectory of the borehole.

56 Claims, 11 Drawing Sheets

U.S. PATENT DOCUMENTS

| | | | |
|---|---|---|---|
| 4,060,141 A | | 11/1977 | Catterfeld ..................... 175/94 |
| 4,185,704 A | | 1/1980 | Nixon, Jr. ..................... 175/76 |
| 4,336,415 A | * | 6/1982 | Walling ................... 138/137 X |
| 4,388,974 A | | 6/1983 | Jones, Jr. et al. ............ 175/325 |
| 4,463,814 A | | 8/1984 | Horstmeyer et al. ......... 175/454 |
| 4,560,934 A | | 12/1985 | Dickinson, III ............. 324/323 |
| 4,568,145 A | | 2/1986 | Colin et al. ................. 350/96.2 |
| 4,619,323 A | | 10/1986 | Gidley ........................ 166/285 |
| 4,698,028 A | | 10/1987 | Caro et al. ................... 439/271 |
| 4,699,454 A | | 10/1987 | Brubaker .................... 350/96.2 |
| 4,844,516 A | | 7/1989 | Baker .......................... 285/351 |
| 5,018,583 A | | 5/1991 | Williams ..................... 166/385 |
| 5,064,268 A | | 11/1991 | Morency et al. .............. 385/87 |
| 5,069,297 A | | 12/1991 | Krueger et al. ............... 175/65 |
| 5,080,175 A | | 1/1992 | Williams ..................... 166/385 |
| 5,094,870 A | | 3/1992 | Williams. ................... 138/115 |
| 5,109,921 A | | 5/1992 | Aracena ....................... 166/65 |
| 5,146,982 A | | 9/1992 | Dinkins ...................... 366/65.1 |
| 5,146,984 A | | 9/1992 | Pleasants .................... 166/238 |
| 5,160,925 A | | 11/1992 | Dailey et al. ............. 340/853.3 |
| 5,172,765 A | | 12/1992 | Sas-Jaworsky et al. ...... 166/384 |
| 5,176,180 A | | 1/1993 | Williams et al. ............ 138/172 |
| 5,186,264 A | | 2/1993 | du Chaffaut ................. 175/27 |
| 5,215,151 A | | 6/1993 | Smith et al. ................... 175/45 |
| 5,233,522 A | | 8/1993 | Sinclair ....................... 364/422 |
| 5,234,058 A | | 8/1993 | Sas-Jaworsky et al. ...... 166/385 |
| 5,235,285 A | | 8/1993 | Clark et al. .................. 324/342 |
| 5,260,662 A | | 11/1993 | Rorden ........................ 324/339 |
| 5,285,008 A | | 2/1994 | Sas-Jaworsky et al. ........ 174/47 |
| 5,285,204 A | | 2/1994 | Sas-Jaworsky ............ 340/854.9 |
| 5,311,952 A | | 5/1994 | Eddison et al. ................ 175/61 |
| 5,314,032 A | | 5/1994 | Pringle et al. ................. 175/74 |
| 5,316,094 A | | 5/1994 | Pringle ......................... 175/74 |
| 5,318,138 A | | 6/1994 | Dewey et al. ................. 175/74 |
| 5,330,807 A | | 7/1994 | Williams .................... 428/34.5 |
| 5,332,048 A | | 7/1994 | Underwood et al. ........... 175/26 |
| 5,332,049 A | | 7/1994 | Tew ........................... 175/320 |
| 5,339,036 A | | 8/1994 | Clark et al. .................. 324/338 |
| 5,348,096 A | | 9/1994 | Williams .................... 166/384 |
| 5,359,324 A | * | 10/1994 | Clark et al. ............. 324/333 X |
| 5,394,951 A | | 3/1995 | Pringle et al. ................. 175/61 |
| 5,423,389 A | | 6/1995 | Warren et al. ................. 175/75 |
| 5,437,899 A | | 8/1995 | Quigley ..................... 428/35.7 |
| 5,438,267 A | * | 8/1995 | Wu ............................. 324/339 |
| 5,442,294 A | | 8/1995 | Rorden ........................ 324/339 |
| 5,469,916 A | | 11/1995 | Sas-Jaworsky et al. ....... 166/64 |
| 5,485,889 A | | 1/1996 | Gray ........................... 175/61 |
| 5,497,707 A | | 3/1996 | Box .......................... 104/138.2 |
| 5,527,220 A | | 6/1996 | Geczy ......................... 464/153 |
| 5,540,870 A | | 7/1996 | Quigley ....................... 264/103 |
| 5,586,084 A | | 12/1996 | Barron et al. ................. 367/85 |
| 5,601,025 A | | 2/1997 | Box .......................... 104/138.2 |
| 5,620,056 A | | 4/1997 | Eppink ........................ 175/95 |
| 5,662,020 A | | 9/1997 | Morita et al. ................... 91/44 |
| 5,713,422 A | | 2/1998 | Dhindsa ...................... 175/27 |
| 5,828,003 A | * | 10/1998 | Thomeer et al. ......... 138/137 X |
| 5,842,149 A | | 11/1998 | Harrell et al. ................. 702/9 |
| 5,913,337 A | * | 6/1999 | Williams et al. ............ 138/125 |
| 5,921,285 A | * | 7/1999 | Quigley et al. ............. 138/125 |
| 5,933,945 A | * | 8/1999 | Thomeer et al. ............. 29/825 |
| 6,004,639 A | * | 12/1999 | Quigley et al. ......... 138/125 X |
| 6,016,845 A | * | 1/2000 | Quigley et al. ............. 138/125 |
| 6,047,784 A | * | 4/2000 | Dorel .......................... 175/61 |
| 6,065,540 A | * | 5/2000 | Thomeer et al. ..... 166/242.6 X |
| 6,257,332 B1 | * | 7/2001 | Vidrine et al. ......... 166/250.15 |
| 6,286,558 B1 | * | 9/2001 | Quigley et al. ............. 138/125 |

OTHER PUBLICATIONS

SPE Petroleum Conference (SPE 028871); *Well Tractors for Highly Deviated and Horizontal Wells*; J. Hallundbaek; Oct. 25–27, 1994; (pp. 57–62).

68$^{th}$ Annual Technical Conference of SPE (SPE 26536); *Development of Composite Coiled Tubing for Oilfield Services*; A. Sas–Jaworsky, J.G. Williams; Oct. 3–6, 1993 (pp. 1–15).

SPE/ADC Drilling Conference (SPE 37656); *Extending the Reach of Coiled Tubing Drilling (Thrusters, Equalizers, and Tractors)*; J. Leising, E.C. Onyia, S.C. Townsend, et al Mar. 4–6, 1997; (pp. 1–14).

Introduction to Petroleum Production Vol. 1 (ISBN 0–87201–767–2); *Reservoir Engineering, Drilling, Well Completions*; D. R. Skinner; Gulf Publishing Company; (pp 1–69); Undated.

International MWD Society; *State of the Art in MWD*; (pp. 28) Jan. 19, 1993.

Oilfield Review; *Measurements at the Bit: A New Generation of MWD Tools*; S. Bonner, T. Burgess, et al; (pp. 44–54) Undated.

Schlumberger/Anadrill; Anadrill Directional Drilling; *People, Tools and Technology Put More Within Your Reach*; (1991) (pp. 6).

SADC/SPE Drilling Conference (IADC/SPE 14764); *Predicting Bottomhole Assembly Performance*; J. Williamson, A. Lubinski; Feb. 10–12, 1986; (pp. 337–342).

Baker Hughes INTEQ; Technical Data Sheet; *NaviGator*™ (6–3/4"); (1994);(pp. 2).

Schlumberger/Anadrill; *An Underground revolution, Ingetrated Drilling Evaluation adn Logging*; (1995); (pp. 12).

Schlumberger/Anadrill; IDEAL *Wellsite Information System*; (pp. 14).

Baker Hughes INTEQ; Technical Services Evaluation Product Line; *The Navigator Sales Orientation Manual*; F. Hearn, et al; (pp. 1–16).

Baker Hughes INTEQ; *NaviGator*™ *Reservoir Navigation Service*; (1996); (pp. 4).

R. L. Gilstrap Co., *The Wellhead CASINJAC*™ *for extra pipe pulling power*; (pp. 7); Undated.

The Natural Selection Research Group; *Inchworm Mobility—Stable, Reliable and Inexpensivle*; A. Ferworn, D. Stacey; (pp. 1–4); Undated.

CSIRO–UTS Electrical Machines; *Oil Well Tractor*, (pp. 1); undated.

Scandinavian Oil–Gas Magazine; *Well Tractor for use in Deviated and Horizontal Wells*;F. Schüssler, (pp. 1–3) Undated.

Shell U.K. Exploration and Production; *The Challenge of Drilling in the New Millenium*; NeuRobot; (2 p.); (at least as early as 1996).

D. Biglin, M. Wassell; APS Technology Self Propelled Drill String; *A Self Propelled Drilling System for Hard–Rock, Horizontal and Coiled Tube Drilling*; (6 pages) May 5, 1998.

European Patent Office Search Report for Appln. No. 98308760.2 dated Jan. 21, 2002; (7 p.).

* cited by examiner

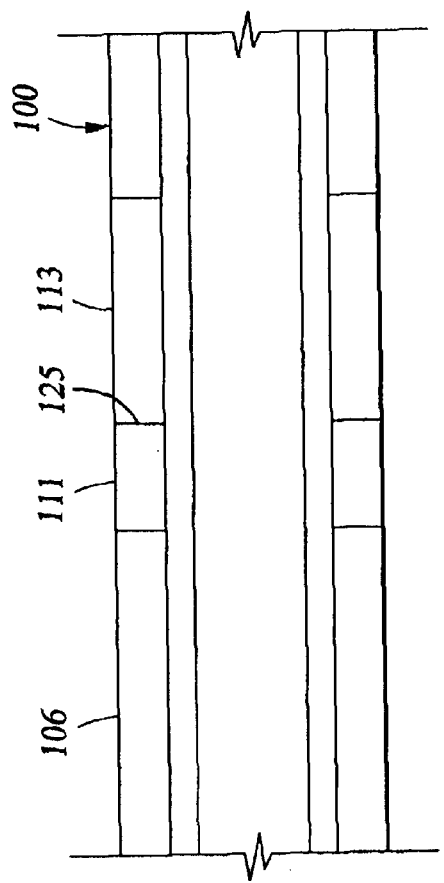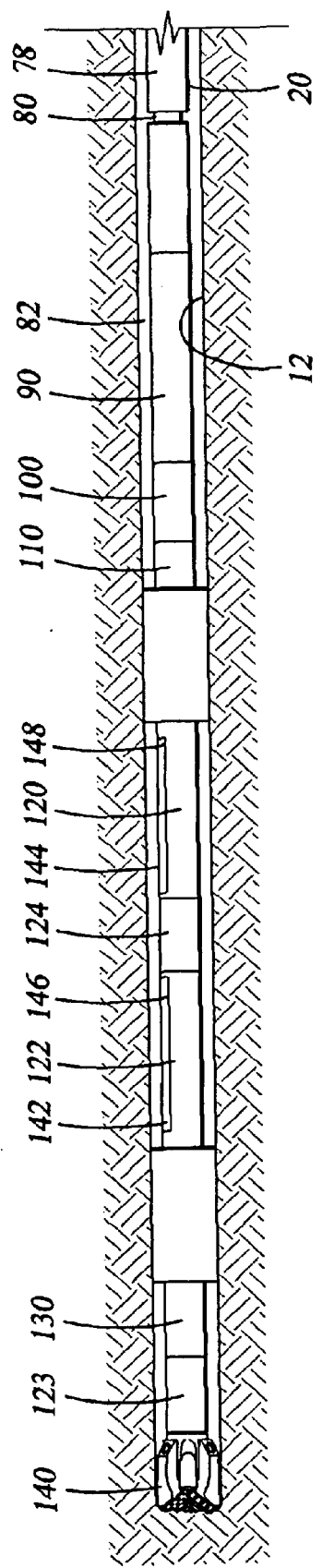

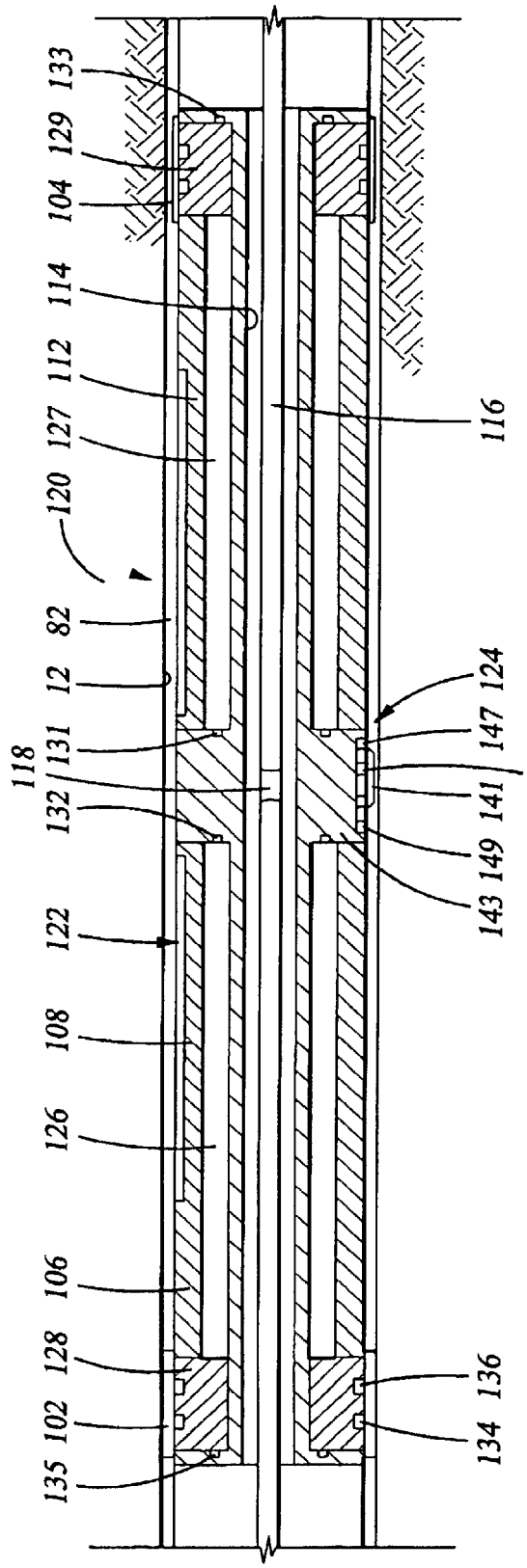
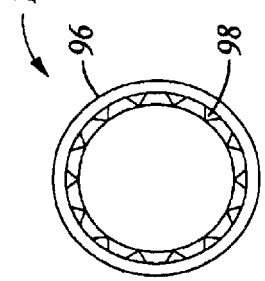
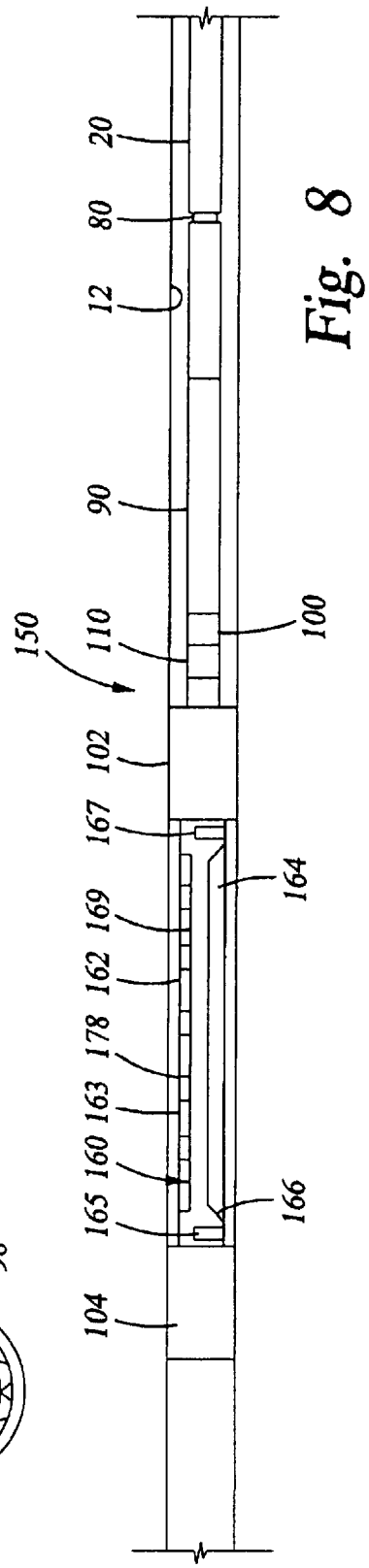

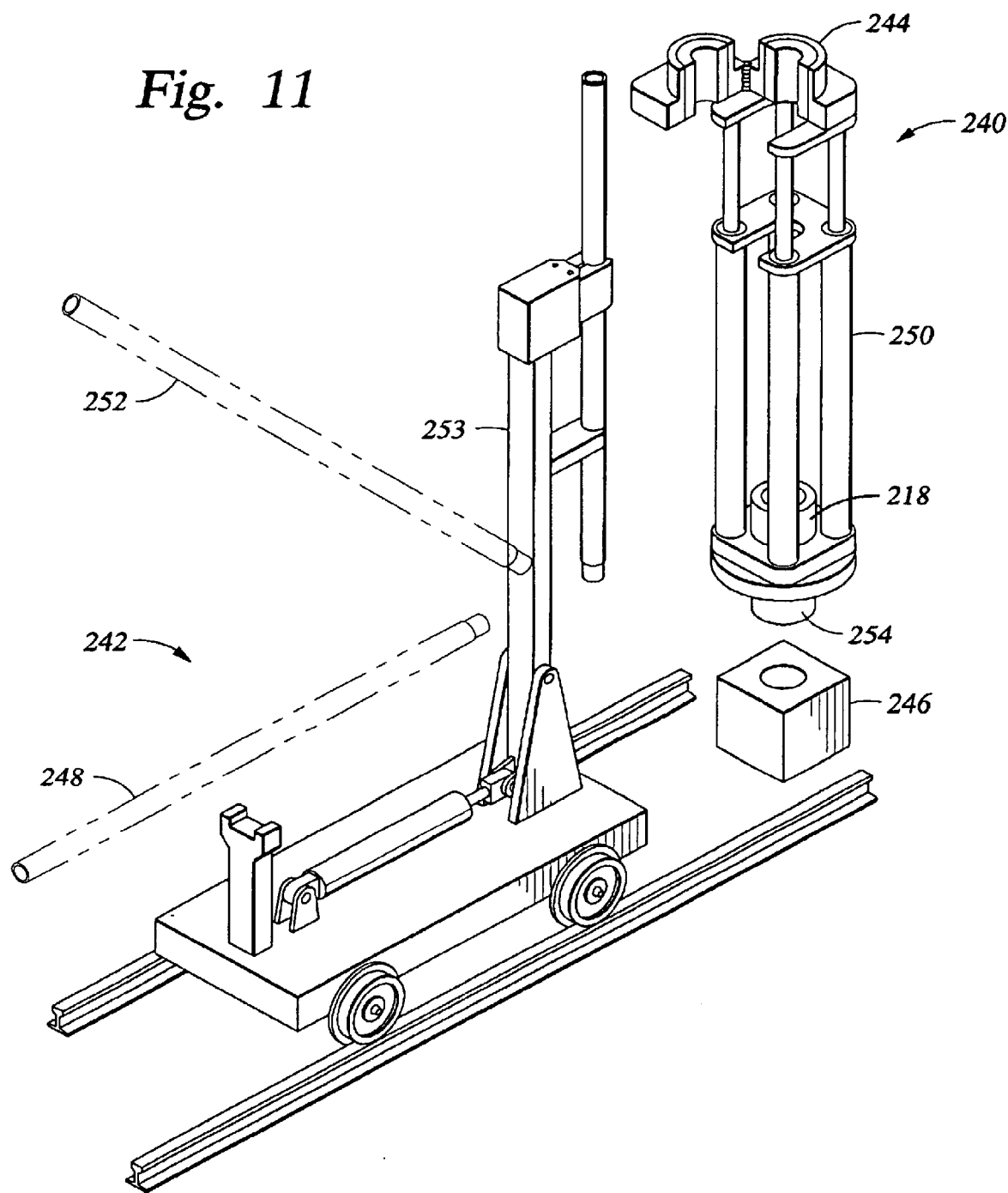

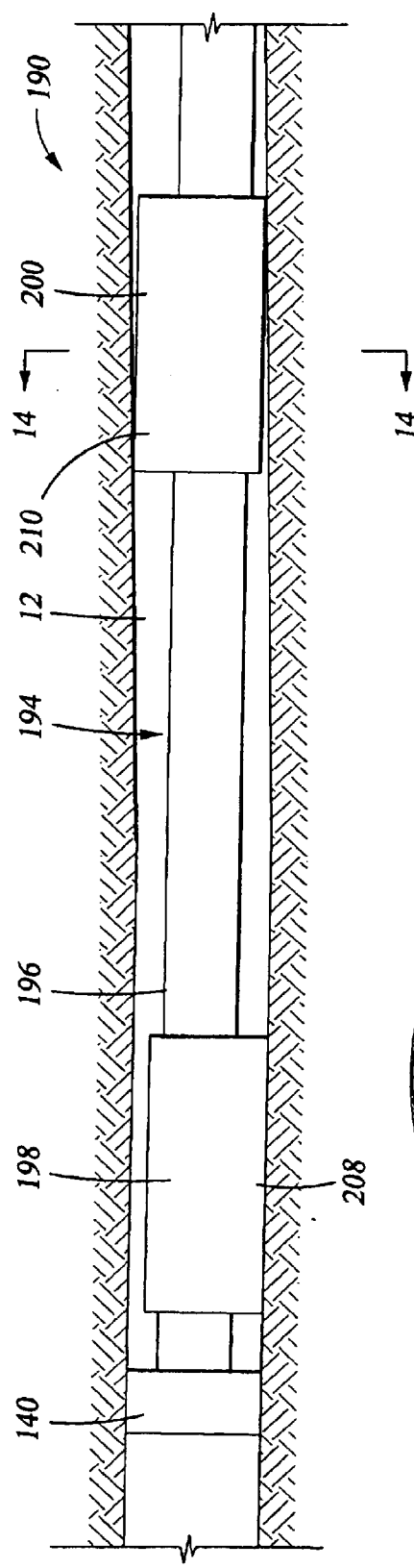
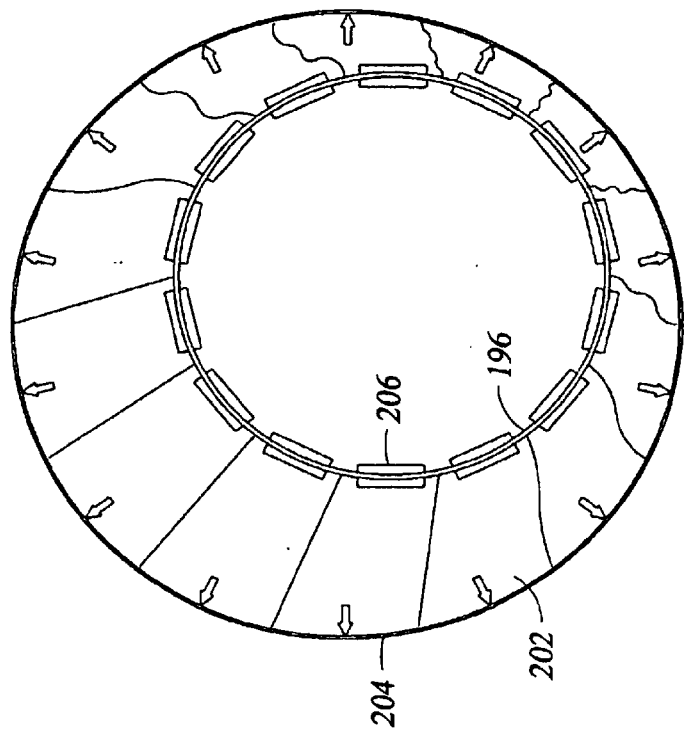
Fig. 13
Fig. 14

WELL SYSTEM

CROSS-REFERENCE TO RELATED APPLICATION

This is a continuation application of U.S. patent application Ser. No. 09/081,961, filed May 20, 1998, now U.S. Pat. No. 6,296,066 and entitled "Well System," which claims the benefit of 35 U.S.C. 119(e) of U.S. Provisional Application Ser. No. 60/063,326, filed Oct. 27, 1997 and entitled "Drilling System", both hereby incorporated herein by reference.

BACKGROUND OF THE INVENTION

The present invention relates to a system using a work string for performing a downhole operation in a well and more particularly includes a bottom hole assembly disposed on a composite umbilical made up of a tube having a portion thereof which is preferably non-metallic. In using the well system for drilling the well, the bottom hole assembly includes a power section for rotating a bit and a propulsion system for moving the bottom hole assembly within the well.

Many existing wells include hydrocarbon pay zones which were bypassed during drilling and completion because such bypassed zones were not economical to complete and produce. Offshore drilling rigs cost approximately $40 million to build and may cost as much as $250,000 a day to lease. Such costs preclude the use of such expensive rigs to drill and complete these bypassed hydrocarbon pay zones. Presently, there is no cost effective methods of producing many bypassed zones. Thus, often only the larger oil and gas producing zones are completed and produced because those wells are sufficiently productive to justify the cost of drilling and completion using offshore rigs.

Many major oil and gas fields are now paying out and there is a need for a cost effective method of producing these previously bypassed hydrocarbon pay zones. The locations and size of these bypassed hydrocarbon zones are generally known, particularly in the more mature producing fields.

To economically drill and complete the bypassed pay zones in existing wells, it is necessary to eliminate the use of conventional rigs and conventional drilling equipment. One method of producing wells without rigs is the use of metal coiled tubing with a bottom hole assembly. See for example U.S. Pat. Nos. 5,215,151; 5,394,951 and 5,713,422, all incorporated herein by reference. The bottom hole assembly typically includes a downhole motor providing the power to rotate a bit for drilling the borehole. The bottom hole assembly operates only in the sliding mode since the metal coiled tubing is not rotated at the surface like that of steel drill pipe which is rotated by a rotary table on the rig. The bottom hole assembly may include a tractor which propels the bottom hole assembly down the borehole. One such tractor is a thruster that pushes off the lower terminal end of the coiled tubing and does not rely upon contacting or gripping the inside wall of the borehole. The depth that can be drilled by such a bottom hole assembly is limited.

One such self-propelled tractor is manufactured by Western Well Tool for propelling a near conventional bottom hole assembly in the borehole. The propulsion system includes an upper and lower housing with a packerfoot mounted on each end. Each housing has a hydraulic cylinder and ram for moving the propulsion system within the borehole. The propulsion system operates by the lower packerfoot expanding into engagement with the wall of the borehole with the ram in the lower housing extending in the cylinder to force the bit downhole. Simultaneously, the upper packfoot contracts and moves to the other end of the upper housing. Once the ram in the lower housing completes its stroke, then the hydraulic ram in the upper housing is actuated to propel the bit and motor further downhole as the lower packerfoot contracts and resets at the other end of the lower housing. This cycle is repeated to continuously move the bottom hole assembly within the borehole. The tractor can propel the bottom hole assembly in either direction in the borehole. Flow passages are provided between the packerfeet and housings to allow the passage of drilling fluids through the propulsion system.

Various companies manufacture self-propelled tractors for propelling the bit and pulling steel coiled tubing in the well. These tractors include self-propelled wheels that frictionally engage the wall of the borehole. However, there is very little clearance between the wheels of the propulsion system and the wall of the borehole and problems arise when the wheels encounter ridges or other variances in the dimensions of the wall of the borehole. Further, at times there is an inadequate frictional engagement between the wheels and the wall of the borehole to adequately propel the tractor.

Other companies also offer tractors to walk the end of a wireline down a cased borehole. However, these tractors engage the interior wall of a casing having a known inside dimension. One such tractor is manufactured by Schlumberger.

The use of metal coiled tubing has various deficiencies. Metal coiled tubing tends to buckle the deeper the bottom hole assembly penetrates the borehole. Buckling is particularly acute in deviated wells where gravity does not assist in pulling the tubing downhole. As the tubing buckles, the torque and drag created by the contact with the borehole becomes more difficult to overcome and often makes it impractical or impossible to use coiled tubing to reach distant bypassed hydrocarbon zones. Further, steel coiled tubing often fatigues from cyclic bending early in the drilling process and must be replaced. It has also been found that coiled tubing may be as expensive to use as a conventional drilling system using jointed steel pipe and a rig.

The bottom hole assembly may also include an orienting tool such as a bent sub or housing for directing the trajectory of the borehole. Some types of orienting tools may be adjusted from the surface. Often, prior art orienting tools require a 360° rotation to ratchet to a new direction of inclination.

The bottom hole assembly may include various sensors such as a gamma ray and inclinometer instrument package adjacent the bit and a multiple depth dual frequency borehole compensated resistivity tool. These tools produce data indicating the inclination and azimuth of the bit and the position of the bottom hole assembly with respect to the formation. The bottom hole assembly may also include other sensors for providing other data relating to the borehole, such as gyroscopic survey data, resistivity measurements, downhole temperatures, downhole pressures, flow rates, velocity of the power section, gamma ray measurements, fluid identification, formation samples, and pressure, shock, vibration, weight on bit, torque at bit, and other sensor data.

Prior art bottom hole assemblies for rotary drilling and for use with metal coiled tubing include electronic components for collecting data, processing the data downhole, and transmitting the processed information to the surface. The processed information may be transmitted to the surface either by conventional wirelines or by mud pulsed telemetry. In mud pulsed telemetry, the processed information is pulsed back to the surface through the mud column using a valve which opens and closes to produce the pulses. See U.S. Pat. No. 5,586,084. The transmission rate for mud pulsed telemetry, however, is limited.

The electronic components in the bottom hole assembly are also limited in the temperature that they can withstand. Once the environment of the electronic components is subjected to high temperatures, such as 305° F. or greater, for any extended period of time, some of the electronic components may stop functioning. Thus, electronic components, such as semiconductor chips, must be carefully produced and selected to ensure that they can withstand the anticipated heat, shock, and vibration of the bottom hole assembly. Since the life of the electronic components is a function of temperature over time, the higher the downhole temperature, the shorter the life of the electronic components. Thus, not only are the electronic components expensive, but the complexity of the equipment for processing the data downhole causes the bottom hole assemblies to be very expensive particularly for logging while drilling. Such electronic components also reduces the reliability of the bottom hole assembly.

In drilling new boreholes from existing wells to produce bypassed zones, it is often necessary to cut an aperture or window in the existing casing followed by a drilling string passing through the window to drill a deviated borehole into the bypassed zone. Prior art tools used in cutting the window in the existing casing produce a window of erratic geometry and often with an irregular shape. Also, the cutting tool tends to produce a jagged edge around the periphery of the window. Oftentimes successive trips are required into the borehole to clean up the window before the new deviated wellbore may be drilled. The irregular shape and jagged edge can cause problems in drilling the new borehole and completing the well. Since the specific location and geometry of the window is unknown, it is also difficult to establish a seal between the casing in the existing borehole and the new casing in the new borehole.

The prior art procedures for sealing the cased borehole with the new casing include filling the gaps between the irregularly shaped window and new casing with cement during the cementing operation. Special cement that is very plastic is often required for flowing into these gaps. Oftentimes the end of the casing must be milled clean. Also often the gaps remain around the window even after the cementing operation such that the cement still may not provide an adequate seal.

The present invention overcomes the deficiencies of the prior art.

SUMMARY OF THE INVENTION

The system of the present invention uses the unique properties of a composite umbilical to extend the reach of bottom hole assemblies into deviated and horizontal subterranean boreholes to over twice and as many as 5 to 10 times the reach previously accomplished by prior art systems. The apparatus used in the inventive system is lighter and more compact than that of other prior art systems including existing tubulars and rigs. The complexity and cost of moving, lifting and installing the inventive system and the space and structural strength required to deploy it are minimal compared to prior art oil and gas rotary drilling rigs or metallic coiled tubing units.

The system of the present invention preferably includes a composite umbilical having a inner fluid impermeable liner, multiple load carrying layers, and an outer wear layer. The load carrying layers are preferably resin fibers braided around the inner liner. Multiple electrical conductors and data transmission conductors are embedded in the load carrying layers for carrying electric current and transmitting data between the bottom hole assembly and the surface. Also, a plurality of sensors may be mounted on one or more of the data transmission conduits along the length of the composite umbilical.

The bottom hole assembly includes a bit, a gamma ray and inclinometer and azimuth instrument package, a propulsion system with steerable assembly, an electronics section, a resistivity tool, a transmission and a power section for rotating the bit. The electrical conductors in the composite umbilical provide power to the electronics section and may provide power to the power section. The data transmission conduits in the composite umbilical may be fiber optic cables which transmit to the surface the data from various sensors such as the gamma ray and inclinometer instrument package and resistivity tool.

The propulsion system includes a housing having an upstream section with a traction module and a downstream section with a traction module. The traction modules are each connected to a ram mounted in a cylinder within one of the housing sections for propelling the bottom hole assembly up and down the borehole. In operation, one of the traction modules expands to engage the borehole while the hydraulic ram forces the bit downhole and pulls the umbilical forward and the other traction module moves to the other end of its housing section in preparation for actuating its ram to move the bit further downhole. The housing of the propulsion system includes a flow bore through which may extend an output shaft operatively connected to the power section on one end and to the bit on the other end. The steerable assembly may be of various types for changing the trajectory of the well such as an adjustable coupling between the two housing sections, a three dimensional, adjustable diameter blade stabilizer mounted on the housing of the propulsion system, or two multi-positional traction modules mounted on the housing of the propulsion system which can individually extend eccentrically. When the steerable assembly is an adjustable coupling, the output shaft through the propulsion system has an articulated joint at the mating of the two housing sections.

The drilling system may also include an alternative bottom hole assembly for cutting a window in an existing cased borehole. The bottom hole assembly is connected to a composite umbilical and includes an upstream and downstream traction module for straddling that portion of the cased borehole in which the window is to be cut. A template is mounted on the housing of the assembly and is hydraulically or electrically actuated into engagement with the inside wall of the cased borehole. A cutting nozzle is mounted on a geared track on the housing to cut the window in the casing as defined by the template. The cut pieces of the casing are then retracted magnetically by electro-magnets and retained in the housing. Once the window has been cut, the bottom hole assembly and pieces of casing are removed from the well. A tubular member with a seal flange is then mounted on a bottom hole assembly. The assembly is run back into the borehole and the tubular member with seal flange is installed in the window. A production string is then run into the well and mounted within the tubular member for producing the bypassed formation. The seal flange seals the connection.

The drilling system also includes a method and apparatus for setting pipe in the new borehole without the use of a rig. Casing rams are used to install the production string in the well.

One advantage of the drilling system of the present invention is the drilling of wells without using a drilling rig. The drilling system may be operated from a vessel and use a subsea drilling template. However, no rig, jack up, or floater is required. The drilling system of the present invention is a rigless umbilical drilling system and can be used for not only reentering existing wells but also for drilling new wells.

Another advantage of the drilling system of the present invention is the significant reduction of the number of crew required to operate the system.

A further advantage is the use of a non-metallic drill string. The elimination of steel work strings enables the elimination of a drilling rig otherwise required to handle metal pipe.

A further advantage of the drilling system of the present invention is the use of a composite umbilical which extends from the bottom hole assembly to the surface. The use of composite umbilical provides enhanced pressure control at the surface since making and breaking of steel tool joints are eliminated. Also, there is a substantially reduced number of upsets on the composite umbilical as compared to steel drill pipe which would otherwise have to pass through the blowout preventer. The composite umbilical is reeled into the borehole to the extent possible and then it is further deployed by a downhole umbilical propulsion system. The composite umbilical is then retrieved by reeling the composite umbilical onto a reel at the surface.

Another advantage of the composite umbilical of the present invention is that the multiple lengths of pipe do not have to be connected and disconnected at the surface to the same extent as required for jointed steel drill pipe using rigs.

A further advantage of composite umbilical is the ability to drill and complete the well at near balance or under balanced. By drilling and completing the well at near balance with the fluid column pressure approximately the same as the formation pressure, less damage is caused to the producing formation.

Another advantage of the present invention is the use of a bottom hole assembly which is anchored to the borehole thus minimizing much of the vibration encountered by conventional bottom hole assemblies. Vibration, harmonics and shock are very damaging to conventional bottom hole assemblies and particularly the electronic components in such assemblies.

Another advantage of the present invention is the use of electrical conductors extending through the composite umbilical. By conducting electrical power between the surface and the bottom hole assembly, alternators and batteries are no longer required in the bottom hole assembly to operate the electronic components.

A further advantage of the present invention is the use of data transmission conduits, such as fiber optic cable or coaxial cable, passing through the wall of the composite umbilical. Such data transmission conductors allow the transmission of raw data received by the sensors in the bottom hole assembly for transmission directly to the surface without exposing the wire which could then be damaged. The data then can be processed at the surface rather than downhole such as in a conventional bottom hole assembly. By processing the data at the surface, larger and more sophisticated and less expensive computer processing systems may be used for analyzing the data. Further, the electronics required in conventional bottom hole assemblies for processing the data downhole may be eliminated thereby reducing the cost of expensive and somewhat fragile downhole electronic components. A still another advantage of using data transmission conduits in the composite umbilical is the ability to transmit the data directly to the surface faster and with greater reliability. The conventional process of pulsing the data through the mud column to the surface is eliminated.

Another advantage of the present invention is the use of connectors for connecting lengths of composite umbilical including the connection of the electrical and data transmission conduits.

A further advantage of the present invention is the use of an efficient, reliable and less expensive downhole umbilical propulsion system and survey system for accurate directional drilling.

Other objects and advantages of the present invention will appear from the following description.

BRIEF DESCRIPTION OF THE DRAWINGS

For a detailed description of a preferred embodiment of the invention, reference will now be made to the accompanying drawings wherein:

FIG. 5 is a schematic of an elevation view of the bottom hole assembly of the present invention connected to the downstream end of the composite umbilical;

FIG. 5A is a schematic of a transmission having an integral counter rotation device for the bottom hole assembly of FIG. 5;

FIG. 6 is a cross-sectional view of the propulsion system with resistivity antennas and a steerable assembly;

FIG. 7 is a cross-sectional view taken at plane 7—7 in FIG. 6 showing one of the traction modules;

FIG. 8 is a schematic elevation view, partly in cross-section, of an alternative embodiment of the bottom hole assembly for cutting a window in an existing cased borehole;

FIG. 11 is a schematic of a system for installing and removing steel pipe in a new borehole;

FIG. 13 is a schematic cross-section view of a propulsion system having an alternative steerable assembly for use with the present invention;

FIG. 14 is a cross section view taken at plane 14 in FIG. 13 of the traction module;

DESCRIPTION OF THE PREFERRED EMBODIMENTS

Figures 1, 10:
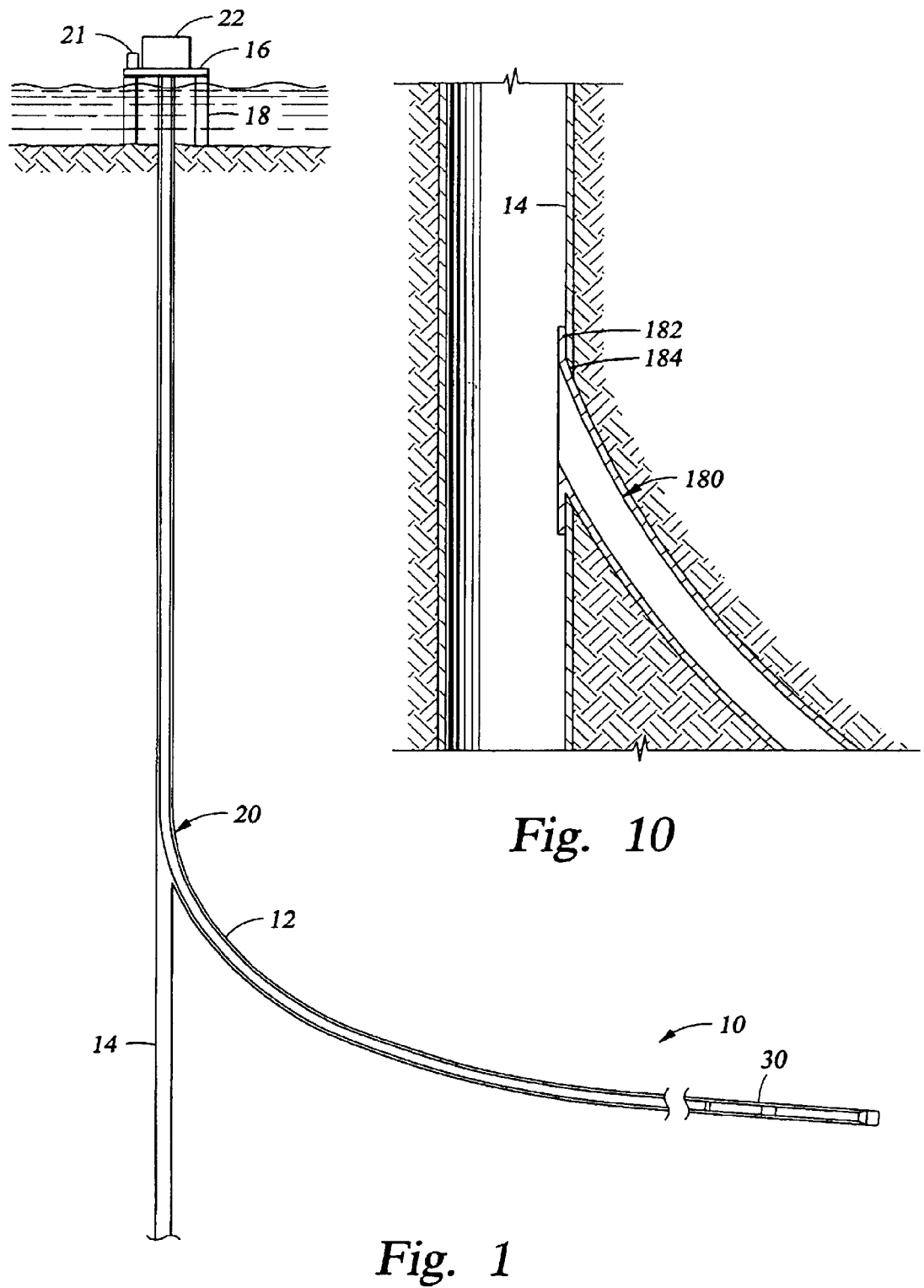
FIG. 1 is a schematic of an elevation view of the drilling system of the present invention in a typical drilling application for a well.
FIG. 10 is a schematic of a cross-sectional view of the window of FIGS. 8 and 9 with a production string installed in the new borehole.

The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

The system of the present invention includes a composite umbilical having a bottom hole assembly attached. Various embodiments of the present invention provide a number of different constructions of the bottom hole assembly, each of which is used for a downhole operation in one of many different types of wells including a new well, an extended reach well, extending an existing well, a sidetracked well, a deviated borehole, and other types of boreholes. It should be appreciated that the bottom hole assembly may be only a downhole tool for performing an operation downhole in the well. Often the downhole operation relates to the drilling and completing of a pay zone in the well but the present invention is not limited to such operations. The embodiments of the present invention provide a plurality of methods for using the system of the present invention. It is to be fully recognized that the different teachings of the embodiments discussed below may be employed separately or in any suitable combination to produce desired results in a downhole operation. In particular the present system may be used in practically any type of downhole operation.

Referring initially to FIG. 1, there is shown a schematic for using the system of the present invention as a drilling system, generally designated 10. The drilling system 10 includes a string of pipe forming a work string 20 with a bottom hole assembly 30 connected to its lower end. The work string 20 and bottom hole assembly 30 are shown disposed in a sidetracked well 12 which deviates from an existing well 14. The drilling system 10 extends from the floor 16 of an existing platform 18 previously used to drill, complete, and produce existing well 14. Various controls 21 are disposed at the surface on the platform 18 for receiving and sending signals downhole. Such controls are well known in the art. It should be appreciated that blowout preventers and other requisite safety control equipment 22 would be disposed on platform floor 16 for drilling and completing well 12. It should also be appreciated that the sidetracked well 12 is merely exemplary for describing the drilling system 10 and its operation in a typical application of the present invention and should in no way be considered as limiting the present invention to sidetracked wells.

A composite umbilical 20 serves as the work string. The operative salient properties of the composite umbilical are a tube having an axial component of the modulus of elasticity with a Young's modulus in the range of 500,000 to 10,500,000 psi. The preferred range of Young's modulus is from 2,000,000 to 5,000,000 psi. The tube is non-isotropic and the modulus of elasticity is not the same in all axes nor is it linear. Embodiments of the pipe may be constructed of fibers such as nonmetallic fibers, metallic fibers, or a mixture of nonmetallic and metallic fibers. One embodiment includes a tube constructed from helically wound or braided fiber reinforced thermoplastic or fiber reinforced thermosetting polymer or epoxy. The fiber may be non-metallic or metallic or a mixture of metallic and non-metallic materials. The composite umbilical preferably is made of a material having a density with a specific gravity in the range of 0.99 grams per cubic centimeter to 2.9 grams per cubic centimeter. Unless defined otherwise, the term composite umbilical as used in the present application shall mean a continuous spoolable or segmented and connected tubular string having the characteristics set forth above. It should be appreciated that although the pipe described above for the present invention does not include coiled tubing, various components of the present invention may be adapted for use with coiled tubing particularly with short reach wells and with smart tractors.

The composite umbilical 20 with the above characteristic provides many advantages. The low modulus of elasticity permits a large tube to be reeled onto a small diameter spool without yielding the material of the umbilical 20. The tube does not fatigue in bending. The lower modulus may allow an indefinite fatigue life of the umbilical from coiling on the spool. Further, the lower modulus provides a very low drag when the umbilical is forced around short radius bends and curvatures in the borehole as the umbilical goes in and out of the well. The low density allows the tube to be light weight for transporting and lifting. Also the tube can be made buoyant in the wellbore by using an appropriately weighted mud or by specifically engineering the tube. A 12.9 pound per gallon mud achieves a neutral buoyancy of the tube in the most preferred geometry. Having a buoyancy close to the weight of the drilling fluids allows a minimum frictional drag on the borehole wall due to gravity as the umbilical moves in and out of the borehole.

The following is a comparison of bending strain between steel and composite coiled tubing:

For 2-7/8" steel tubing; typical yield stress $\theta_y$=80,000 psi

Therefore the yield strain $\epsilon_y$=$\theta_y$/E where E is the Young's Modulus of the material.

Since $E_{steel}$=30×10$^6$ psi, then, $\epsilon_{y(steel)}$=80000/30000000= 0.00267 in/in In the same manner; $E_{composite}$=1.43×10$^6$ psi; and typically $\theta_{y(composite)}$=26000 psi Therefore, $\epsilon_{y(composite)}$=26000/1430000=0.01818 in/in The maximum bending strain before yielding composite pipe is 6.81 times higher than for steel. For bending calculation, see "Mark's Standard Handbook for Mechanical Engineers," Baumeister, Theodore, Avallone, Eugene A., Baumeister, Theodore III, Eighth Edition, McGraw-Hill Book Company, New York, 1978, pg. 5–54, incorporated herein by reference.

The following provides a comparison of the forces required to pull either steel or composite coiled tubing illustrating the ability of a system with a downhole propulsion system and composite umbilical to move deeper into the borehole and to be retrieved from the borehole.

The force needed to pull either steel or composite coil tubing to overcome simple sliding friction is:

The pull force required for steel tubing ($F_{steel}$):

$$F_{steel} = \mu * W_{steel} * K_{steel} * L_{steel}$$

Where, $\mu$=coefficient of friction of wellbore (assume 0.5)

$W_{steel}$=weight per foot of steel=4.53 lb/ft (2-7/8" OD×5/16" wall)

$K_{bst}$=buoyancy factor for steel in 12.5 ppg mud=0.809

$L_{steel}$=length of pipe in horizontal=10000 ft.

Therefore, the force required to pull 10000 ft. of steel is:

$$F_{steel} = 18,324 \text{ lbs.}$$

In the same manner for composite;

μ=coefficient of friction of wellbore (assume 0.5)

Wcomposite$_1$=weight per foot of composite=1.7 lb/ft (2-7/8" OD×5/16" wall,

K$_{bcomposite}$=buoyancy factor for composite in 12.5 ppg mud=0.0157

L$_{composite}$=length of pipe in horizontal=10000 ft.

Therefore, the force required to pull 10000 ft. of composite is:

$$F_{composite} = 133 \text{ lbs.}$$

The force required to pull 10000 ft. of steel pipe is 138 times greater than the force required to pull the same amount of composite pipe. For friction calculation, see "Mark's Standard Handbook for Mechanical Engineers," Baumeister, Theodore, Avallone, Eugene A., Baumeister, Theodore III, Eighth Edition, McGraw-Hill Book Company, New York, 1978, pg. 3–24 to 3–27, incorporated herein by reference.

Figure 17:
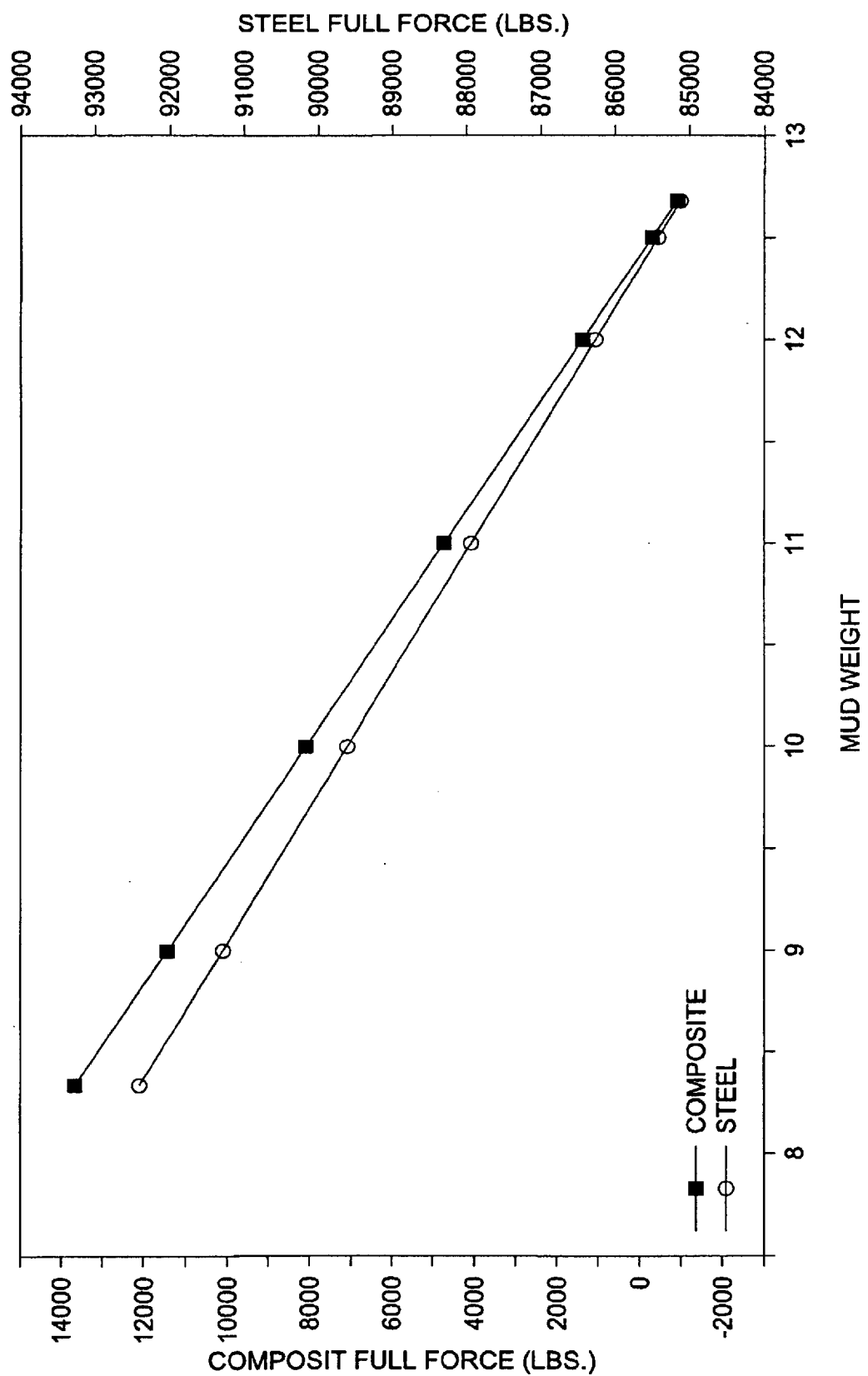
FIG. 17 is a graph comparing pull forces versus mud weight on composite an steel coil tubing.

Referring now to FIG. 17, there is shown a graph comparing the pull forces needed to drill a 50,000 foot lateral well using either composite or steel coil tubing under different buoyancy conditions, i.e. different mud weights.

Figure 2:
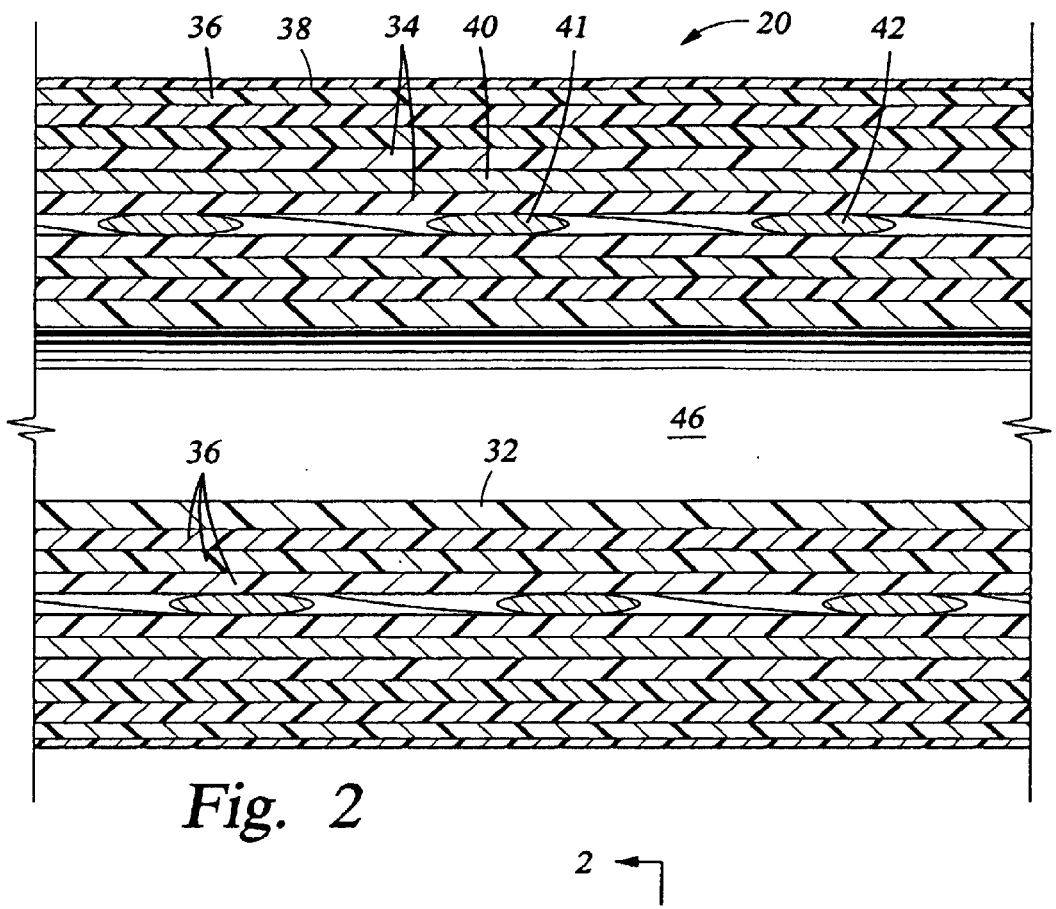
FIG. 2 is a cross-section view of the composite umbilical of the present invention.
Figure 3:
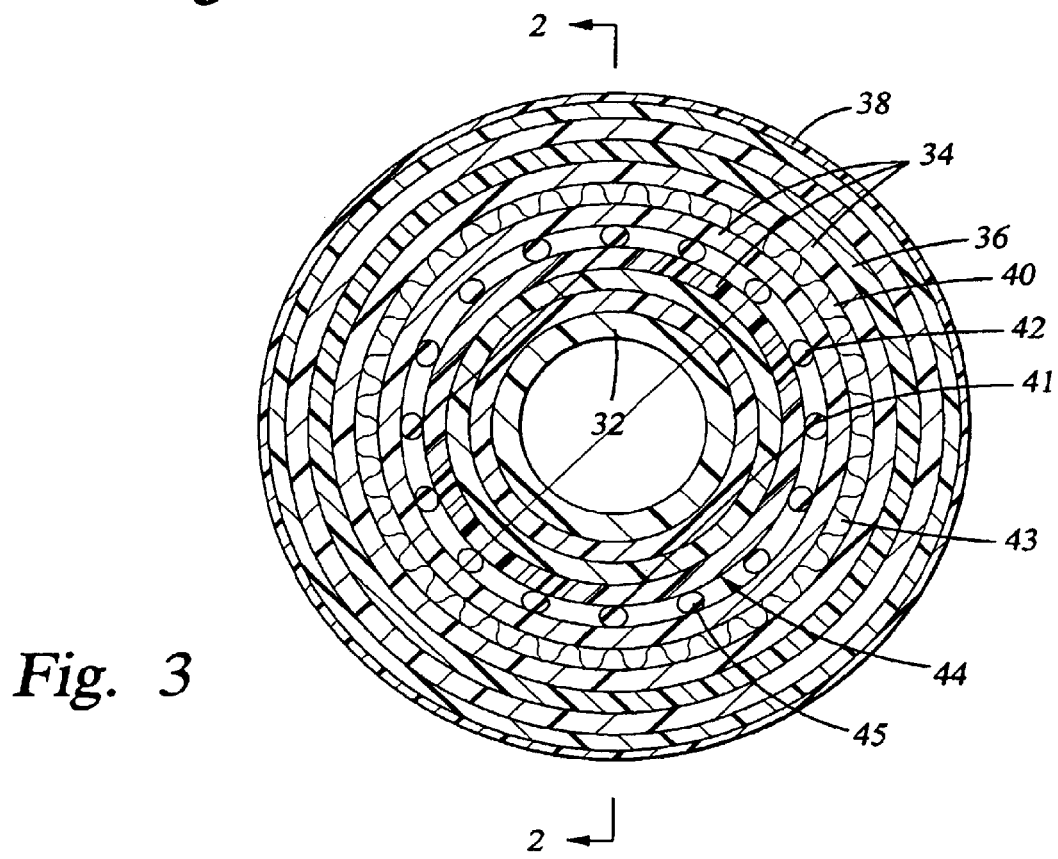
FIG. 3 is a cross-sectional view taken of plane 3—3 in FIG. 2 of the composite umbilical having electrical conductors and data transmission conductors.

Referring now to FIGS. 2 and 3, the tube for umbilical 20 is preferably of a composite material having the characteristics described above. Composite umbilical 20 preferably has an impermeable fluid liner 32, a plurality of load carrying layers 34, and a wear layer 36. As best shown in FIG. 3, a plurality of conductors 40, 42 are embedded in the load carrying layers 34. These conductors may be metallic or fiber optic conductors, such as electrical conductors 40 and data transmission conductors 42. One or more of the data transmission conduits 42 may include a plurality of sensors 44. It should be appreciated that the conductors may be passages extending the length of umbilical 20 for the transmission of pressure fluids.

Types of composite tubing are shown and described in U.S. Pat. Nos. 5,018,583; 5,097,870; 5,176,180; 5,285,008; 5,285,204; 5,330,807; 5,348,096; and 5,469,916, each of these patents is incorporated herein by reference. See also "Development of Composite Coiled Tubing for Oilfield Services," by A. Sas-Jaworsky and J. G. Williams, SPE Paper 26536, 1993, incorporated herein by reference. U.S. Pat. Nos. 5,080,175; 5,172,765; 5,234,058; 5,437,899; and 5,540,870, each of these patents being incorporated herein by reference, disclose composite rods, electrical or optical conductors housed in a composite cable.

The impermeable fluid liner 32 is an inner tube preferably made of a polymer, such as polyvinyl chloride or polyethylene. Liner 32 can also be made of a nylon, other special polymer, or elastomer. In selecting an appropriate material for fluid liner 32, consideration is given to the chemicals in the drilling fluids to be used in drilling the sidetracked well 12 and the temperatures to be encountered downhole. The primary purpose for inner liner 32 is as an impermeable fluid barrier since carbon fibers are not impervious to fluid migration particularly after they have been bent. The inner liner 32 is impermeable to fluids and thereby isolates the load carrying layers 34 from the drilling fluids passing through the flow bore 46 of liner 32. Inner liner 32 also serves as a mandrel for the application of the load carrying layers 34 during the manufacturing process for the composite umbilical 20.

The load carrying layers 34 are preferably a resin fiber having a sufficient number of layers to sustain the required load of the work string 20 suspended in fluid, including the weight of the composite umbilical 20 and bottom hole assembly 30. For example, the umbilical 20 of FIG. 2 has six load carrying layers 34.

The fibers of load carrying layers 34 are preferably wound into a thermal setting or curable resin. Carbon fibers are preferred because of their strength, and although glass fibers are not as strong, glass fibers are much less expensive than carbon fibers. Also, a hybrid of carbon and glass fibers may be used. Thus, the particular fibers for the load carrying layers 34 will depend upon the well, particularly the depth of the well, such that an appropriate compromise of strength and cost may be achieved in the fiber selected. Typically an all carbon fiber is preferred because of its strength and its ability to withstand pressure.

Load carrying fibers 34 provide the mechanical properties of the composite umbilical 20. The load carrying layers 34 are wrapped and braided so as to provide the composite umbilical 20 with various mechanical properties including tensile and compressive strength, burst strength, flexibility, resistance to caustic fluids, gas invasion, external hydrostatic pressure, internal fluid pressure, ability to be stripped into the borehole, density i.e. flotation, fatigue resistance and other mechanical properties. Fibers 34 are uniquely wrapped and braided to maximize the mechanical properties of composite umbilical 20 including adding substantially to its strength.

The wear layer 36 is preferably braided around the outermost load carrying layer 34. The wear layer 36 is a sacrificial layer since it will engage the inner wall of the borehole 12 and will wear as the composite umbilical 20 is tripped into the well 12. Wear layer 36 protects the underlying load carrying layers 34. One preferred wear layer is that of Kevlar™ which is a very strong material which is resistant to abrasion. Although only one wear layer 36 is shown, there may be additional wear layers as required. One advantage of wear layer 36 is that one can be of a different fiber and color making it easy to determine the wear locations on composite umbilical 20. It should be appreciated that inner liner 32 and wear layer 36 are not critical to the use of composite umbilical 20 and may not be required in certain applications. A pressure layer 38 may also be applied although not required.

During the braiding process, electrical conductors 40, data transmission conductors 42, sensors 44 and other data links may be embedded between the load carrying layers 34 in the wall of composite umbilical 20. These are wound into the wall of composite umbilical 20 with the carbon, hybrid, or glass fibers of load carrying layers 34. It should be appreciated that any number of electrical conductors 40, data transmission conduits 42, and sensors 44 may be embedded as desired in the wall of composite umbilical 20.

The electrical conductors 40 may include one or more copper wires such as wire 41, multi-conductor copper wires, braided wires such as at 43, or coaxial woven conductors. These are connected to a power supply at the surface. A braided copper wire 43 or coaxial cable 45 is wound with the fibers integral to the load carrying layers 34. Although individual copper wires may be used, a braided copper wire 43 provides a greater transmission capacity with reduced resistance along composite umbilical 20. Electrical conductors 40 allow the transmission of a large amount of electrical power from the surface to the bottom hole assembly 30 through essentially a single conductor. With multiplexing, there may be two-way communication through a single conductor 41 between the surface and bottom hole assembly 30. This single conductor 41 may provide data transmission to the surface.

The principal copper conductor 40 used for power transmission from the power supply at the surface to the bottom hole assembly 30 is preferably braided copper wire 43. The braided cooper wire 43 may be used to provide the power for power section 90 which rotates the bit 140. Braided copper wire 43 may conduct a large voltage, such as 400 volts of electricity, from the surface which will generate heat which must be dissipated. Braided copper wire 43 is preferably disposed between the two outermost load carrying layers 34. By locating braided copper wire 43 adjacent the outer diameter of composite umbilical 20, the braided copper wire 43 is disposed over a greater surface area of layers 34 to maximize the dissipation of heat.

The data transmission conduit 42 may be a plurality of fiber optic data strands or cables providing communication to the controls at the surface such that all data is transmitted in either direction fiber optically. Fiber optic cables provide a broad band width transmission and permit two-way communication between bottom hole assembly 30 and the surface. As previously described, the fiber optic cable may be linear or spirally wound in the carbon, hybrid or glass fibers of load carrying layers 34.

As shown in FIG. 3, sensors 44 are embedded in the load carrying layers 34 and connected to one or more of the data transmission conductors 42 such as a fiber optic cable. As an alternative to embedded sensors, the fiber optic cable may be etched at various intervals along its length to serve as a sensor at predetermined locations along the length of composite umbilical 20. This allows the pressures, temperatures and other parameters to be monitored along the composite umbilical 20 and transmitted to the controls at the surface.

Composite umbilical 20 is coilable so that it may be spooled onto a drum. In the manufacturing of composite umbilical 20, inner liner 32 is spooled off a drum and passed linearly through a braiding machine. The carbon, hybrid, or glass fibers are then braided onto the inner liner 32 as liner 32 passes through multiple braiding machines, each braiding a layer of fiber onto inner liner 32. The finished composite umbilical 20 is then spooled onto a drum.

During the braiding process, the electrical conductors 40, data transmission conductors 42, and sensors 44 are applied to the composite umbilical 20 between the braiding of load carrying layers 34. Conductors 40, 42 may be laid linearly, wound spirally or braided around umbilical 20 during the manufacturing process while braiding the fibers. Further, conductors 40, 42 may be wound at a particular angle so as to compensate for the expansion of inner liner 32 upon pressurization of composite umbilical 20.

Composite umbilical 20 may be made of various diameters. Although a 1½ inch diameter is typically used for metal coiled tubing, composite umbilical 20 preferably has a diameter greater than 1½ inches. The size of umbilical, of course, will be determined by the particular application and well for which it is to be used.

Although it is possible that the composite umbilical 20 may have any continuous length, such as up to 25,000 feet, it is preferred that the composite umbilical 20 be manufactured in shorter lengths as, for example, in 1,000, 5,000, and 10,000 foot lengths. A typical drum will hold approximately 12,000 feet of composite umbilical. However, it is typical to have additional back up drums available with additional composite umbilical 20. These drums, of course, may be used to add or shorten the length of the composite umbilical 20. With respect to the diameters and weight of the composite umbilical 20, there is no practical limitation as to its length.

Composite umbilical 20 has all of the properties requisite to enable the drilling and completion of extended reach wells. In particular, composite umbilical 20 has great strength for its weight when suspended in fluid as compared to ferrous materials and has good longevity. Composite umbilical 20 also is compatible with the drilling fluids used to drill the borehole and approaches buoyancy (dependent upon mud weight and density) upon passing drilling fluids down its flowbore 46 and back up the annulus 82 formed by the borehole 12. This reduces to acceptable limits drag and other friction factors previously encountered by metal pipe. Composite umbilical 20 may be used in elevated temperatures particularly when a heat exchanger is placed on drilling platform 16 to cool the drilling fluids circulating through the borehole 12. Since the composite umbilical 20 is not rotated to rotate bit 140, no torque is placed on composite umbilical 20.

Figure 4:
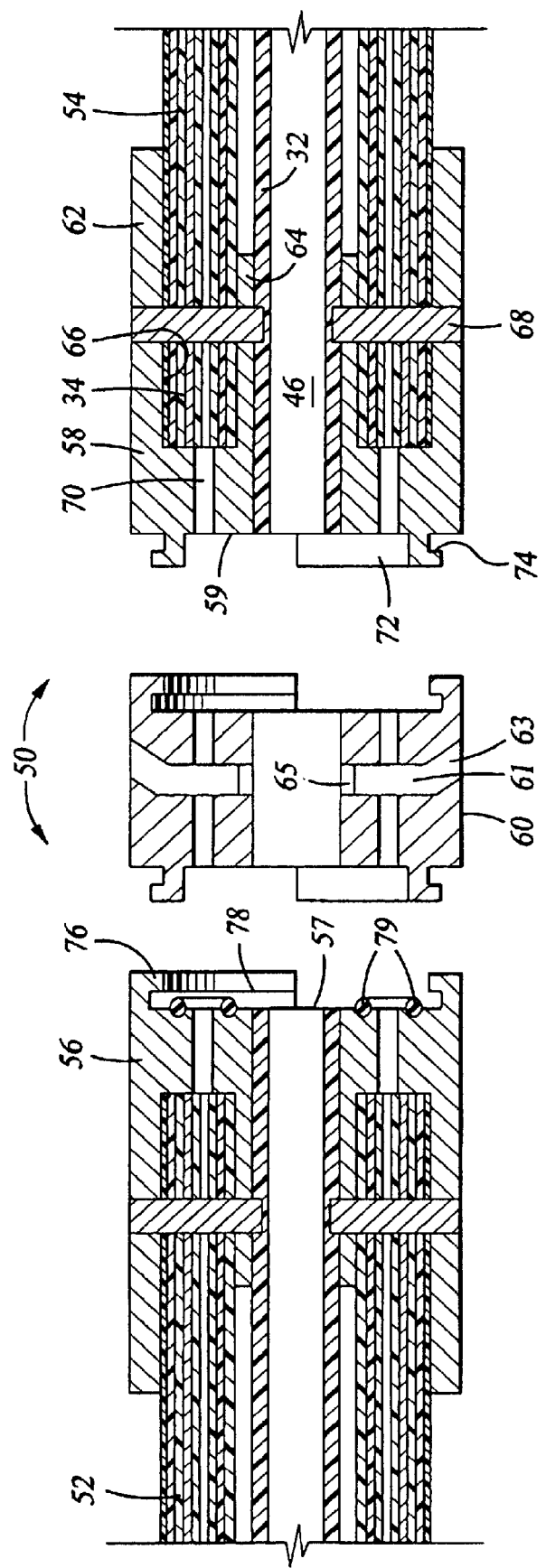
FIG. 4 is a cross-sectional view of a connector connecting two lengths of composite umbilical.

Referring now to FIG. 4, there is shown a connector 50 for connecting adjacent lengths 52, 54 of composite umbilical 20. A jet sub 60 may be disposed in connector 50 as hereinafter described. Connector 50 includes a female end connector 56 mounted on composite umbilical length 52 and a male end connector 58 mounted on composite umbilical length 54. Describing end connector 58 in detail, end connector 58 includes an end face 59, an outside tubular housing 62 and an inner tubular skirt 64 forming an annular area 66 for receiving a plurality of load carrying layers 34. As can be seen, inner liner 32 extends through inner tubular skirt 64. One or more pins 68 extend through housing 62, load carrying layers 34, and inner skirt 64 for connecting end connector 58 to the terminal end of composite umbilical length 54. Other types of connectors are shown in U.S. Pat. Nos. 4,844,516 and 5,332,049, both incorporated herein by reference.

A plurality of connectors 70 are provided in the end face 59 of end connector 58 for connection to electrical conductors 40 and data transmission conductors 42 housed between load carrying layers 34. Connectors for fiber optic cables are described in U.S. Pat. Nos. 4,568,145; 4,699,454; and 5,064,268, all incorporated herein by reference. A connector for coaxial cable is shown in U.S. Pat. No. 4,698,028, incorporated herein by reference. For electrical conductors in tubing, see U.S. Pat. No. 5,146,982, incorporated herein by reference. Another type of fiber optic connector is manufactured by Dean G. O'Brien of California.

Connector 50 is a quick connect connector. One type of quick connection is the bayonet type connection shown in FIG. 4. The male end connector 58 includes a plurality of arcuate segments 72 having a outwardly projecting tapered surface 74 adapted for mating with female connector 56 having a plurality of arcuate segments 76 with an inwardly directed and tapered flange 78. In operation, the segments on male end connector 58 are inserted between the segments 76 on end connector 56 and then end connector 58 is rotated with tapered surfaces 74, 78 drawing the two end faces 57, 59 of end connectors 56, 58 together. The end face of female end connector 56 includes a plurality of high pressure sealing members 79 which sealingly engage the end face 59 of male end connector 58. Upon full engagement of end connectors 56, 58 to form connector 50, the connectors 70 for electrical conductors 40 and data transmission conductors 42 are in alignment and are connected for transmission of electrical current or data.

It should be appreciated that an apparatus may be used on the platform, floor 16 for connecting connector 50. One such apparatus may include a vise for that end of the length of the composite umbilical 20 extending into the well 12 and a tong for the end of the new length of composite umbilical 20 whereby the tong inserts and rotates the new length to form the connection 50.

It should be appreciated that end connectors 56, 58 are preferably mounted on the ends of composite umbilical 20 during, the manufacturing process and therefore are already mounted on the ends of umbilical 20 upon transport to the drilling site. It should also be appreciated that the end connectors 56, 58 need not be made of metal but may be made of a composite. A composite end connector could be heat bonded to the end of composite umbilical 20. Also, it should be appreciated that other types of quick connections could be used such as the type of quick connection used for high pressure hose connections.

One alternative to the individual connectors 64, 66 for conductors 40, 42 are communication links which electromagnetically transmit signals around the connections rather than go through connector 50. See U.S. Pat. No. 5,160,925, incorporated herein by reference. It is preferred, however, for the conductors 40, 42 to be directly connected together at connection 50.

Connectors, comparable to connector 50, are used to connect the downstream end of composite umbilical 20 to the bottom hole assembly 30 and to the electrical systems at the surface for providing electrical power and for processing the data. The connectors 50 will also be used to repair a damaged end of composite umbilical 20 such that the damaged end may be cut off and the remainder reconnected to the work string 20. It is preferred that custom lengths of composite umbilical 20 not be made for each well.

Referring now to FIG. 5, bottom hole assembly 30 is shown connected to the down stream end 78 of composite work string 20 by a release tool 80. Release tool 80 is preferably connected to one of the conductors 40, 42 for electrical actuation from the surface. Various types of release tools may be used as release tool 80, such as an explosive charge, a chemical cutter, or a mechanical release. One type of mechanical release for releasing metal coiled tubing is disclosed in U.S. Pat. No. 5,146,984, incorporated herein by reference. The preferred release tool 80 includes a charge detonated electrically to sever the connection between bottom hole assembly 30 and work string 20. Such a release tool is simple and reliable. Release tool 80 is required should bottom hole assembly 30 get stuck in the well 12.

The bottom hole assembly 30 shown in FIG. 5 is used for drilling the borehole 12 and includes a power section 90, a surface controlled transmission 100, an integral counter rotation device 125, an electronics section 110, a downhole umbilical propulsion system 120, a resistivity tool 121, a steerable assembly 124, a gamma ray and inclinometer instrument package 130 and a bit 140 mounted on drill stem 123. The power section 90 provides the power for rotation of bit 140. The propulsion system 120 provides the motive force to walk the bottom hole assembly 30 in or out of the borehole 12. It should be appreciated that the composite umbilical 20 cannot be pushed into the borehole. The propulsion system 120 can pull the composite umbilical 20 into the borehole or it can be used to back the composite umbilical out of the borehole. Resistivity tool 121 determines the formation resistivity around the bottom hole assembly 30 and includes a resistivity antenna 122 housed in propulsion system 120 and an electronics package housed in electronics section 110. Steerable assembly 124 changes the trajectory of the borehole 12 and is preferably housed in propulsion system 120. The gamma ray and inclinometer instrument package 130 evaluates the characteristics of the formation at the bit 140 and provides early information about the orientation and angle control of the bit 140 within the borehole 12.

It should also be appreciated that the bottom hole assembly 30 may include a concentric adjustable stabilizer such as that disclosed in U.S. Pat. No. 5,332,048, incorporated herein by reference. The stabilizer may be disposed anywhere on bottom hole assembly 30 depending upon the application.

It should be appreciated that the make up of bottom hole assembly 30 will vary with the application and well. Examples of other tools that may be added to bottom hole assembly 30 include an NMR magnetic resonance imaging tool for transmitting data to the surface indicating various characteristics of the fluids in the surrounding formation including their transportability, identification, and composition. It should also be appreciated that different types of sensors may be included in the electronic section 110 or located elsewhere on bottom hole assembly 30 for providing other information concerning drilling and the formation such as tri-axial accelerometers and inclinometers for directional control and surveying. For example, all of the parameters and characteristics that are determined with logging while drilling may be included in bottom hole assembly 30. Other parameters and characteristics from sensors include operating pressures, operating temperatures, annular pressure, formation pressure, pressure sampling, fluid identification, gyroscopic surveying, porosity, and density.

The power section 90 may be one or a combination of power sources including a hydraulic drive, an electric drive, a turbine, a vane type motor, or any other downhole motor for powering bit 140. The power section 90 may change its torque or RPM characteristics and can be controlled from the surface.

One typical power section 90 includes a downhole hydraulic motor using conventional positive displacement for rotating the output shaft. The motor has a rotor and stator with the rotor rotating as hydraulic fluids pass down through composite umbilical 20 and between the rotor and stator in the power section 90. The rotor is connected to an output shaft which feeds into the surface controlled transmission 100. Power from the transmission 100 is transmitted to the bit 140 by means of a rotating shaft which may include one or more constant velocity joints. A downhole drilling motor is disclosed in U.S. Pat. No. 5,620,056, incorporated herein by reference.

It should be appreciated that the electrical conductors 40 of composite umbilical 20 extending to the surface allow the power section 90 to include one or more electric motors. Current may be conducted from the surface to operate a multi-stage electric motor as power section 90. Such a multi-stage motor has the ability to supply the required performance characteristics at the drill bit 140. Multi-stage motors are also rugged, reliable and can be sealed from drilling fluids.

It should be appreciated that even though non hydraulic motors may be used as power section 90, drilling fluids are still passed down the flowbore 46 of composite umbilical 20 and up the outer annulus 82 formed by borehole 12 and composite umbilical 20 to remove the cuttings of the drill bit 140 and to cool and lubricate the bit 140 and other components of bottom hole assembly 30.

Surface controlled transmission 100 may be used and is mounted on the downstream end of power section 90 to vary and adjust the performance characteristics of the power section 90. The transmission 100 alters the properties of the power output from power section 90 such as changing torque and/or RPM characteristics. Depending upon the type of power used in power section 90, transmission 100 may or may not be used and includes a gear reduction or gear increase. Referring now to FIG. 5A, transmission 100 preferably also includes a integral counter rotation device 125 which can be controlled from the surface and allow for reverse rotation of the propulsion system 120. The integral counter rotation device 125 includes a connection 111 between the transmission 100 and propulsion system 120 and a motor 113 for providing relative rotation between the stationary transmission 100 and the propulsion system 120. The integral counter rotation device 125 is used to allow counter rotation of the propulsion system 120 to maintain the correct orientation of the bend angle of the steerable assembly 124 on the propulsion system 120 if the propulsion system 120 has been rotated slightly out of proper orientation due to reactive torque. It should also be appreciated that a motor could also be adapted to rotate the bit 140 in a direction opposite to that of the power section 90.

The electronics section 110 provides the electronics package and instrumentation for measurements, logging, and pay zone steering while drilling. The electronics section 110 includes the electronics package for the resistivity tool 121 and is connected to resistivity antenna 122 in propulsion system 120. Tools measuring resistivity are shown in U.S. Pat. Nos. 5,233,522; 5,235,285; 5,260,662; 5,339,036; and 5,442,294, all incorporated herein by reference. The electronics section 110 serves as a formation measuring tool.

Referring now to FIGS. 6 and 7, the downhole umbilical propulsion system 120 serves multiple purposes including the thrusting or propulsion of the bottom hole assembly 30 in either direction, the resistivity measurements of the surrounding formation, and the steerable assembly 124 for pay zone steering the borehole trajectory. Propulsion system 120 includes a housing 106 which has a flow bore 114 therethrough for the drilling fluids flowing down through flowbore 46 of composite umbilical 20. It should be appreciated that there must be sufficient flow area to obtain adequate down hole flow and yet maintain sufficient wall thickness in housing 106.

For self-propulsion, propulsion system 120 becomes the prime mover and includes a downstream packer-like traction module 102 and an upstream packer-like traction module 104. It should be appreciated that the propulsion system 120 may include more than two traction modules. Housing 106 of propulsion system 120 includes a downstream section 108 and an upstream section 112 and is approximately 20 feet long with each of the housing sections 108, 112 being approximately 10 feet long. A power output shaft 116 extends through central flowbore 114 and may include an articulation joint 118 adjacent the center of propulsion system 120 depending upon the type of steering assembly 124 being used.

As best shown in FIG. 7, there is shown a cross-section of traction module 102. Since traction modules 102, 104 are similar in construction, a description of one traction module approximates the description of the other. Traction module 102 includes steel feet 96 around its outer circumference which may be expanded and contracted into engagement with the wall of borehole 12. A plurality of flutes or longitudinal fluid flow passages 98 are provided around the inner circumference of the steel bands forming feet 96 to allow drilling fluid to flow upstream through annulus 82 when traction module 102 is expanded into engagement with the wall of borehole 12. Traction modules 102, 104 may have independently inflatable, individual chambers, as hereinafter described in detail, for expanding modules 102, 104 eccentrically with respect to the housing 106.

Downstream housing section 108 includes a tubular cylinder 126 in which is disposed a hydraulic ram 128 on which is mounted downstream traction module 102. Hydraulic ports 135, 132 are disposed at the opposite ends of tubular cylinder 126 for applying hydraulic pressure to ram 128. Hydraulic ports 134, 136 are disposed adjacent downstream traction module 102 for expanding and contracting the traction module in and out of engagement with the wall of borehole 12. It should be appreciated that upstream housing section 112 is similar in construction and operation. It should also be appreciated that propulsion system 120 includes a series of valves using fluid pressure for the actuation of traction modules 102, 104 and rams 128, 129 mounted on traction modules 102, 104, respectively.

The cycle of propulsion system 120 includes expanding downstream traction module 102 into engagement with the interior of borehole 12 with the upstream traction module 104 in the contracted and non-engaged position. Hydraulic pressure is applied through hydraulic ports 135 applying pressure to ram 128. As pressure is applied against ram 128 which is stationary due to its attachment to engaged traction module 102, housing 106 moves down hole driving bit 140 forwardly upstream. Hydraulic fluid is simultaneously applied through hydraulic port 133 causing contracted upstream traction module 104 to move forward on upstream housing section 112. Upstream traction module 104 moves forward simultaneously with housing 106 moving downhole and actuating the bit 140. Once the downstream traction module 102 reaches the upstream end of tubular cylinder 126, it has completed its forward stroke and is contracted. Simultaneously, upstream traction module 104 has now completed its travel to the downstream end of tubular cylinder 127 and it is in its reset position to start its downward stroke of bit 140. Traction module 104 is then expanded into engagement with borehole 12. As hydraulic pressure is applied through hydraulic port 131 and against upstream ram 129, propulsion system 120 strokes downwardly against bit 140. Simultaneously, downstream traction module 102 is contracted and reset by applying hydraulic pressure through upstream port 132. The cycle is then repeated allowing the propulsion system 120 to move continuously downstream in one fluid motion and provide a downward pressure on drill bit 140. Each stroke approximates the length of housing sections 108, 112.

It should be appreciated that the hydraulic actuation may be reversed whereby propulsion system 120 may be moved upstream in borehole 12. In other words, propulsion system 120 can walk either forward, downstream, or backward, upstream in borehole 12. It also should be appreciated that although propulsion system 120 is shown as being hydraulically actuated, it may also be operated electrically with power being provided by power transmission conductor 43.

It should be appreciated that although the propulsion system 120 has been described with two traction modules, the propulsion system 120 may be configured with additional traction modules, such as three traction modules, depending upon the application.

Western Well Tool, Inc. manufactures a tractor having expandable and contractible upstream and downstream packerfeet mounted on a hydraulic ram and cylinder for self-propelling drilling bits. The Western Well Tool tractor is described in a European patent application PCT/US96/13573 filed Aug. 22, 1996 and published Mar. 6, 1997, publication No. WO 97/08418, incorporated herein by reference.

Other propulsion systems may be adapted for use with the bottom hole assembly 30 of the present invention. Other types of tractors include an inchworm by Camco International, Inc., U.S. Pat. No. 5,394,951, incorporated herein by reference and by Honda, U.S. Pat. No. 5,662,020, incorporated herein by reference. Also robotic tractors are produced by Martin Marietta Energy Systems, Inc. and are disclosed in U.S. Pat. Nos. 5,497,707 and 5,601,025, each incorporated herein by reference. Another company manufactures a tractor which it calls a "Helix". See also "Inchworm Mobility—Stable, Reliable and Inexpensive," by Alexander Ferwom and Deborah Stacey; "Oil Well Tractor" by CSIRO-UTS of Australia; "Well Tractor for Use in Deviated and Horizontal Wells" by Fredrik Schussler; "Extending the Reach of Coiled Tubing Drilling (Thrusters, Equalizers, and Tractors)" by L. J. Leising, E. C. Onyia, S. C. Townsend, P. R. Paslay and D. A. Stein, SPE Paper 37656, 1997, all incorporated herein by reference. See also "Well Tractors for Highly Deviated and Horizontal Wells", SPE Paper 28871 presented at the 1994 SPE European Petroleum Conference, London Oct. 25–27, 1994, incorporated herein by reference.

Referring again to FIG. 6, the steerable assembly 124 preferably provides three dimensional steering and may include either an adjustable coupling, such as disclosed in U.S. Pat. No. 5,311,952, incorporated herein by reference, or a variable eccentric adjustable diameter blade stabilizer. FIG. 6 illustrates a variable eccentric adjustable diameter blade stabilizer having a plurality of stabilizer blades 141 disposed azimuthally in slots around the mid-portion 143 of housing 106. Each stabilizer blade 141 is mounted on one or more ramp members 145 integral with housing 106 such that upon axial movement of stabilizer blade 141, ramp surfaces 145 cam blade 141 radially outward and into engagement with the wall of borehole 12. Blades 141 may be variably and adjustably moved radially outward by an electrically actuated screw 147 mounted adjacent the upstream end of blade 141 in housing 106. Electric screw 147 is electrically connected to one or more of the electrical conductors 40 for actuation from the surface. A spring member 149 is mounted in the housing 106 at the downstream end of blade 141 for retracting blade 141 into the housing slot. Each of the stabilizer blades mounted on housing 106 are individually adjustable radially whereby the fulcrum at the center of housing 106 for bit 140 may be varied to alter the trajectory of the bit in substantially any direction. Eccentric blade stabilizers are described in U.S. Pat. Nos. 3,129,776; 4,185,704; 4,388,974; and 5,423,389, each of these patents being incorporated herein by reference.

If the steerable assembly 124 includes an adjustable coupling between housing section 106, 112, shaft 116 articulates at articulation joint 118. One type of adjustable coupling is disclosed in U.S. Pat. No. 5,314,032, incorporated herein by reference. Power may be transmitted through propulsion system 120 through the articulation joint 118 by means of a constant velocity U-joint or a torsion rod. One type of articulation joint is shown in U.S. Pat. No. 5,527,220, incorporated herein by reference. A titanium flex shaft may also be used. Steerable assembly 124 is preferably controlled from the surface although it may be controlled downhole in bottom hole assembly 30.

Referring now to FIGS. 13–16, there are shown alternative embodiments for steering the bottom hole assembly. These are embodiments additional to the surface controlled articulated (either mechanically, hydraulically or electrically) joint between the two traction modules as was originally described.

Referring now to FIGS. 13 and 14, the bottom hole assembly 190 includes a drill bit 140 mounted on a downhole umbilical propulsion system 194. Propulsion system 194 includes a housing 196 having two traction modules 198, 200 mounted adjacent each end thereof. Traction modules 198, 200 have individually inflatable chambers 202 disposed between steel feet 204 and housing 196. An independent valve 206 is provided for each chamber 202 and can be inflated to an individual predetermined pressure so as to expand each chamber to individual extents on selected arcuate portions of the feet 204 thereby moving the housing 196 eccentrically with respect to the borehole 12. As shown in FIGS. 13 and 14, the chambers 202 of the near bit traction module 198 are fully inflated adjacent the low side 208 of the borehole 12 to raise the housing 196 with respect to the low side 208 borehole 12 and the chambers 202 of the far bit traction module 200 are fully inflated on the high side 210 of the borehole 12 to lower the housing 196 with respect to the low side 208. This places an upward force on the bit 140 causing the bottom hole assembly 190 to build angle and incline the well path upwardly. Likewise, the inflation of the modules 198, 200 may be reversed to drop angle. It should also be appreciated that chambers 202 can be individually inflated in a predetermined manner in each of the traction modules 198, 200 to change the inclination and azimuth of the well path in any preferred three dimensional direction. This method can be used to steer the bit 140 in any direction and does not require an articulated joint between the two traction modules 198, 200.

Figure 15:
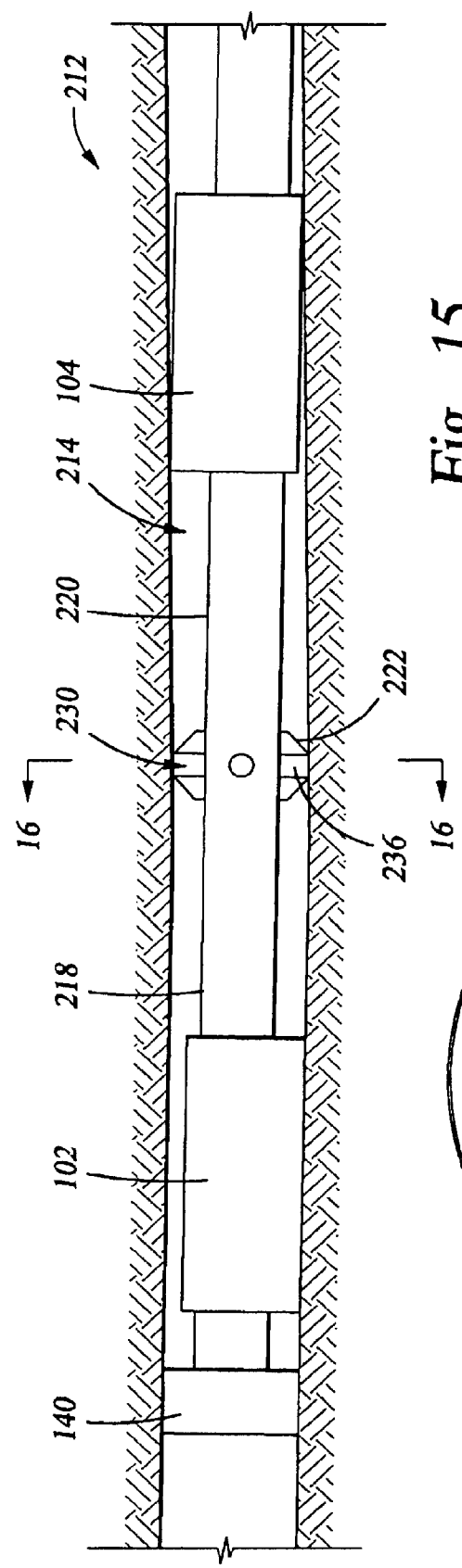
FIG. 15 is a schematic cross-section view of a propulsion system having another alternative steerable assembly for use with the present invention.
Figure 16:
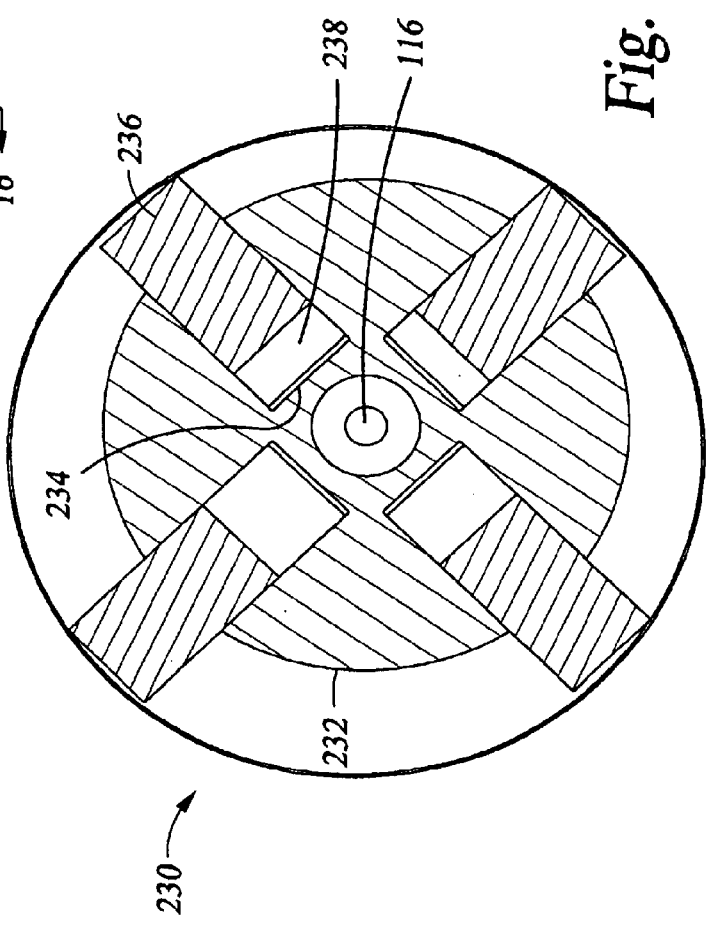
FIG. 16 is a cross section view taken at plane 16 in FIG. 15 of the steering actuator for the steerable assembly of FIG. 15.

Referring now to FIGS. 15 and 16, the bottom hole assembly 212 includes a drill bit 140 mounted on a downhole umbilical propulsion system 214. Propulsion system 194 includes a housing having two housing sections 218, 220 coupled together by an adjustable coupling 222 The output shaft 116 includes an articulation joint 118. (See FIG. 6) The housing can have an integral articulated joint for maximum bend or a limber flex joint that allows for bending at that point in the housing. Standard concentric traction modules 102, 104 mounted on housing sections 218, 220, respectively, adjacent the outer end thereof. A steering assembly 230 is disposed around adjustable coupling 222 between the two traction modules 102, 104. The steering assembly 230 includes a steering actuator 232 having individual and independent either mechanical, hydraulic, or electrical actuators 234 connected to a plurality of shafts 236. There are preferably four shafts 236. Shafts 236 extend through apertures 238 in steering actuator 232 and are connected to individual actuators 234 for each extending a shaft 236 a predetermined distance from steering actuator 232. As the steering actuator 232 is actuated from the surface, it causes the housing between the two traction modules 102, 104 to bow thereby exerting a lateral force on the drill bit 140 in the same direction as the extended shaft 236 in the steering actuator 232. The shafts 236 can be individually extended in a predetermined manner by the individual actuators 234 to change the inclination and azimuth of the well path in any preferred three dimensional direction.

It is possible that the traction modules may rotate slightly in the opposite direction of the bit rotation due to reactive torque. The downhole umbilical propulsion system 120 includes integral counter rotation device 125 to automatically counter rotate the propulsion system 120 to maintain correct orientation of the bend angle such that the correct direction of the borehole trajectory is maintained.

The downhole umbilical propulsion system 120 contains an integral WOB/TOB (weight on bit and torque at bit) sensor. This sensor provides information to the surface computer which process the data and then issues instructions to the propulsion system 120 such that the bit RPM and applied weight on the bit can be modified to optimize ROP (rate of penetration) and reduce bit bounce and bit balling. Flow rates and flow pressure can also be modified to improve ROP.

In operation, the propulsion system 120 is maintained in one orientation such that upon articulation between housing sections 108, 112 by steerable assembly 124, there is a known inclination at the bit 140. Thus, propulsion system 120 does not rotate nor does it roll within borehole 12 by design.

Propulsion system housing 106 includes aligned channels 142, 144 in housing sections 108, 112, where an articulation joint 118 is required. However, this will depend upon the steerable assembly 124 being used. Note also that a flex joint may be used in place of the articulated joint 118. Also the articulated joint 118 can be smart (surface controlled) or dumb (no control and it is just used to allow for maximum bend between the traction modules) much like a flex joint.

Resistivity antenna 122 is in two parts, a downstream antenna 146 and an upstream antenna 148 housed in channels 142, 144, respectively. Each channel 142, 144 is sealed to cover antennas 146, 148 and prevent antennas 146, 148 from coming into contact with fluids. Antennas 146, 148 are housed in channels 142, 144, respectively, so that antennas 146, 148 do not break as housing 106 flexes during operation. Resistivity antennas 146, 148 and receivers have a combined overall length of approximately 12 feet. Thus, traction modules 102, 104 must be at least 12 feet apart to allow room for antennas 146, 148. Resistivity antennas 146, 148 can investigate formation depths of approximately 10 to 34 inches from the propulsion system housing 106.

Resistivity antennas 146, 148 are flexible wires which are connected by a common connection that extends across articulation joint 118 and has a data transmission conduit connected to electronics section 110. The data feed for the resistivity measured by antenna 122 is first transmitted to the electronics section 110 and then transmitted to the surface. As previously described, the antennas 146, 148, their common connection and the related electronics package in electronics section 110 together form resistivity tool 121. It should be appreciated that although it is preferred to locate resistivity antennas 146, 148 between traction modules 102, 104, resistivity antennas 122 may be located upstream of traction module 104.

This formation data is then transmitted via fiber optic cables 42 from electronics section 110 to the surface where it is processed by the controls 21 to identify the formation properties immediately surrounding the bottom hole assembly 30. The combination of resistivity measurements, gamma, inclination at bit all facilitate pay zone steering from the surface.

Several companies manufacture a resistivity tool including Halliburton, Schlumberger, Dresser Sperry, Inc. and Baker Hughes. Resistivity tools are also described in U.S. Pat. No. 5,318,138, incorporated herein by reference.

A gamma ray and inclinometer instrument package 130 is disposed forward of downstream propulsion system 120 between propulsion system 120 and drill stem 123 on which drill bit 140 is mounted. It is preferred that the gamma ray and inclinometer instrument package 130 be disposed forward of downstream propulsion system 120 so as to be as near to bit 140 as possible. The gamma ray and inclinometer instrument package 130 is a tool having a magnetometer and sensors for detecting the dynamic inclination and azimuth of drill bit 140. The gamma ray and inclinometer instrument package 130 includes pay zone steering tools for guiding the trajectory of the well path. The gamma ray and inclinometer instrument package 130 is connected to the electronic section 110 by means of an electro-magnetic data transmission system, such as that described in U.S. Pat. No. 5,160,925, incorporated herein by reference, with the data being transmitted to the surface through one or more of the data transmission conduits 42 in composite umbilical 20.

The resistivity measurements from the resistivity tool 121, the inclination and azimuth measurements from the gamma ray and inclinometer instrument package 130, and the tri-axial accelerometers are the primary measurements for geo-steering or pay zone steering of the well path. These measurements are processed at the surface to ensure the proper direction of the drilling of bit 140 or if necessary, to correct the direction of the well path by means of the steerable assembly 124.

In the present invention, the downhole umbilical propulsion system 120 is integral with the steerability of the bottom hole assembly 30 due to the resistivity antennas 146, 148 being mounted on propulsion system 120 and the gamma ray and inclinometer instrument package 130 being disposed between propulsion system 120 and bit 140. In the prior art, some formation sensors are located upstream of the steerable assembly bend angle as for example 10–50 feet from the bit, which affect the ability to sense the need for course correction in time to avoid drilling into problem zones. By locating the steerability assembly 124 in the propulsion system 120, the propulsion system 120 may be located very close to bit 140 and the bent sub of a conventional bottom hole assembly is eliminated. Alternatively, the resistivity antenna 122 could be mounted above propulsion system 120.

Although resistivity tool 121 has been shown as being included with bottom hole assembly 30, it should be appreciated that a resistivity tool is not required to operate the drilling system 10 of the present invention. The gamma ray and inclinometer instrument package 130 can provide adequate pay zone steerability without resistivity measurements in many applications. Further, since the drilling system 10 of the present invention will often be used in existing wells, the existing wells will have previously been mapped and the coordinates of the bypassed hydrocarbon zones will have previously been determined such that a well plan can be designed with a geometric well path to the bypassed hydrocarbons without the need of their location through the use of resistivity or other pay zone steering sensors. The pay zone capability gamma ray and inclinometer instrument package 130 will guide the bit 140 along the pre-determined mapped well path.

In operation, the bottom hole assembly 30 is assembled including bit 140, gamma ray and inclinometer instrument package 130, downhole umbilical propulsion system 120, steerable assembly 124, resistivity tool 121, electronics section 110, transmission 100, and power section 90. The bottom hole assembly 30 is then connected to the lower end of composite umbilical 120 to the top of the release tool 80. The bottom hole assembly 30 is lowered into the borehole 12 on composite umbilical 20. One preferred method of deploying the composite umbilical 20 in the well is to first deploy a 10,000 length of composite umbilical 20 and then deploy individual 1,000 foot lengths connected together by connector 50. Drilling fluids flow down the flowbore 46 of composite umbilical 20, through power section 90, the flow bore 114 through propulsion system 120, through the bit 140 and back up the annulus 82 to the surface. Where the power sections 90 is a downhole positive displacement motor, turbine, or other hydraulic motor, the drilling fluids rotate the rotor within the stator causing the output shaft 116 extending through the propulsion system 120 to operatively rotate bit 140. The resistivity antenna 122 receives feedback from the formation and sends the resistivity data to the electronic section 110. Likewise, the gamma ray and inclinometer instrument package 130 provides data on the surrounding formation and the inclination and azimuth near the bit 140. The electrical conduit 40 in the composite umbilical 20 provides electrical power to the electronic section and all downhole sensors except the gamma ray and inclinometer instrument package 130 and is used to power the power section 90 when the power section 90 is an electric motor.

For additional information on directional drilling, see U.S. Pat. No. 5,332,048; Introduction to Petroleum Production, Chapters 2 and 3, Volume I, by D. R. Skinner; "State of the Art in MWD" by the International MWD Society, Jan. 19, 1993; "Measurements at the Bit: A New Generation of MWD Tools", April/July 1993 issue of Oilfield Review; "Anadrill Directional Drilling People, Tools and Technology Put More Within Your Reach" by Anadrill Schlumberger, 1991; "Predicting Bottomhole Assembly Performance" by J. S. Williamson and A. Lubinski, IADC/SPE 14764, 1986; "Technical Data Sheet for Navigator" by Baker Hughes Inteq, 1994; "An Underground Revolution, Integrated Drilling Evaluation and Logging" By Anadrill Schlumberger, 1995; "Ideal Wellsite Information System" by Anadrill Schlumberger; "The Navigator Sales Orientation Manual" By Frank Hearn, John Hickey, Paul Seaton and Les Shale; and "Navigator Reservoir Navigation Service" by Baker Hughes 1996, all incorporated herein by reference.

The propulsion system 120 propels the bit 140 into the formation for drilling the new borehole 12. The rate of penetration or feed is controlled from the surface. The only rotating portion of the bottom hole assembly 30 is the output shaft 116 and bit 140. The composite umbilical 20 and the remainder of the bottom hole assembly 30 do not rotate within the borehole 12. Thus, the drilling system 10 of the present invention only operates in the sliding mode in that the composite umbilical 20 never rotates for purposes of drilling. The sensors in the gamma ray and inclinometer instrument package 130, the tri-axial accelerometers and the resistivity tool 121 provide the operator at the surface with the orientation, direction and location of the bit 140 and the proximity of the borehole 12 relative to the pay zone in the formation. The propulsion system 120 may then be articulated by steerable assembly 124 to properly direct the bit 140 in response to the data from the directional and pay zone sensors. It should be appreciated that the bottom hole assembly 30 may be controlled by a control circuit, such as a microcontroller circuit in the controls 21 at the surface, which receives downhole signals and data through the data transmission conduits 42 in the wall of the composite umbilical 20, analyzes these signals and data, and then sends instructions downhole through the data transmission conduits 42 to direct the downhole operation. See for example U.S. Pat. No. 5,713,422, incorporated herein by reference.

Referring again to FIG. 4, a jet sub 60 may be disposed between the end connectors 56, 58 of connector 50. Jet sub 60 includes a plurality of ports 61 communicating with the flowbore 46 and a nozzle 63 in each port 61 extending to exterior of jet sub 70 at an upstream angle. A valve 65 is also disposed in each port 61 for controlling the passage of fluid through ports 61. Valves 65 may be controlled from the surface. As the cuttings from bit 140 travel up annulus 82, they may tend to concentrate in the annulus 82 and fail to flow to the surface. Reverse jet sub 60 allows hydraulic fluid to pass through nozzle 63 to form fluid jets to force the cuttings up past the shoe of the cased borehole where friction is reduced and the cuttings are allowed to flow to the surface. Reverse jet subs 60 may be disposed at each connection 50 to sweep the cuttings up the annulus so that they can be flowed to the surface.

It should be appreciated that although the bottom hole assembly 30 has been described with only one downhole umbilical propulsion system 120, the bottom hole assembly may include more than one downhole umbilical propulsion system 120 and may consist of two or more downhole umbilical propulsion systems such as in tandem to provide additional power for propelling the bit 140. Such downhole umbilical propulsion systems may contain two or more traction modules depending upon the application.

It should further be appreciated that the bottom hole assembly 30 need not be directed solely for use in drilling but may in fact be other well tools to perform other operations in a well. Such well tools include a well intervention tool, a well stimulation tool, a logging tool, a density engineering tool, a perforating tool, or a mill.

The composite umbilical 20 is not required to withstand a great amount of tension or compression. As the drilling fluids pass down the flowbore 46 and up the annulus 82, the drilling fluids provide a buoyancy to composite umbilical 20 thereby reducing the tension and compression placed on composite umbilical 20. Further, since composite umbilical 20 does not rotate within the borehole, composite umbilical 20 is isolated from any reactive torque from bottom hole assembly 30.

The composite umbilical 20 also has sufficient tensile and compression strength to withstand most extraordinary conditions during drilling. For example, if the bottom hole assembly 30 becomes stuck in the well, the composite umbilical 20 has sufficient tensile strength to withdraw the stuck bottom hole assembly 30 in most situations. Further, if the bottom hole assembly 30 is run into a producing well, the composite umbilical 20 may be run in against the pressure of the producing well which applies compressive loads as the result of hydrostatic or formation pressures. This sometimes occurs in a workover well to be restimulated to enhance production. The composite umbilical 20 will have internal pressure from the drilling fluids so as to balance the external well pressure as well as adequate collapse strength.

The electronics used in the electronics section 110 are inexpensive as compared to the electronic components of conventional bottom hole assemblies. Thus, even if the electronics were to degrade over time because of high temperatures, the bottom hole assembly 30 may be retrieved from the well and the electronic boards in the electronic section 110 replaced or repaired.

Various types of data may be transmitted to the surface utilizing the data transmission conduits 42 in the composite umbilical 20. Some of the types of data which may be transmitted to the surface include inclination, azimuth, gyroscopic survey data, resistivity measurements, downhole temperatures, downhole pressures, flow rates, rpms of the power section, gamma ray measurements, fluid identification, formation samples, and pressure, shock, vibration, weight on bit, torque at bit, and other sensor data. The bottom hole assembly, for example, may include a pressure sub for sensing the pressure in the annulus 82 of borehole 12.

The data transmission conduit 42 is preferably fiber optic cable. Fiber optic cable has a very large band width allowing the transmission of large amounts of data which then can be processed by powerful computers at the surface. Using fiber optic cable, the data transmission rates are fast and a greater amount of data can be transmitted. By processing the data at the surface, the bottom hole assembly 30 is much less expensive and is much more efficient. The ability to have a high data transmission rate to the surface allows the elimination of most of the electronics of prior art bottom hole assemblies. It also enhances the reliability of transmission of the data to the surface since pulsing the data through the mud column is eliminated.

The electrical conductors 40 in composite umbilical 20 allow more power to be transmitted downhole. This allows the resistivity measurements to reach deeper into the formation. Further, an alternator or a battery section is no longer required in the bottom hole assembly to power all except gamma ray and inclinometer instrument package 130. Greater power from the surface can also be used to transmit electrical current into the formation to enhance resistivity measurements by resistivity tool 121.

It should be appreciated that the composite umbilical 20 and propulsion system 120 may be used to convey various well apparatus into the well and be used with bottom hole assemblies having other applications in the drilling, completion and production of wells. The composite umbilical 20 and propulsion system 120 may be used during drilling to move in and out of the borehole such well apparatus as an electric motor, turbine, vane, or positive displacement drilling motor, various types of sensors to measure three dimensional position in space, a member for displacing formation such as a bit or jets, a caliper log (sonic or mechanical), a directional kick-off device such as whipstock, a casing mill, a casing exit system (chemical or explosive) or other downhole tool used in drilling. The composite umbilical 20 and propulsion system 120 may also be used with various drilling performance sensors such as gamma, resistivity, magnetic resonance (MRI), sonic, neutron density, temperature, pressure, formation pressure, or other downhole parameter. The composite umbilical 20 and propulsion system 120 may further be used with drilling performance sensors such as weight on bit, torque on bit, rate of penetration, pipe pressure, annulus pressure, shock and vibration, motor rpms, differential pressure across the motor, or other performance parameters. Various steering apparatus may be used with the composite umbilical 20 and propulsion system 120 such as a fixed bend in or above the motor, a fixed bend in or above the motor with an orienter, an adjustable bent sub in or above the motor with an adjustable orienter, a three dimensional or lesser steering system, one or more back flow check valves, a circulating sub, a quick disconnect sub, a casing collar locator, batteries, an electric turbine, electronics, stabilizers or other device used for steering the bottom hole assembly. The composite umbilical 20 and propulsion system 120 may also be used with production equipment such as a downhole pump, an open hole packer, a cased hole packer, a sand screen, a pressure control downhole valve, a perforated liner, a perforating gun, or other device used to produce the well. The composite umbilical 20 and propulsion system 120 may further be used with workover equipment or for treating the formation such as casing scrapers, jet cleaning tools, acids and other well treatment fluid systems, zonal treatment fluid systems or other devices for workover or treating the well. The composite umbilical 20 and propulsion system 120 may also be used to convey a well intervention tool, a well stimulation tool, a density engineering tool or a logging tool as for example. The above lists of well service and maintenance tools are intended to be exemplary and not all inclusive.

Figure 9:
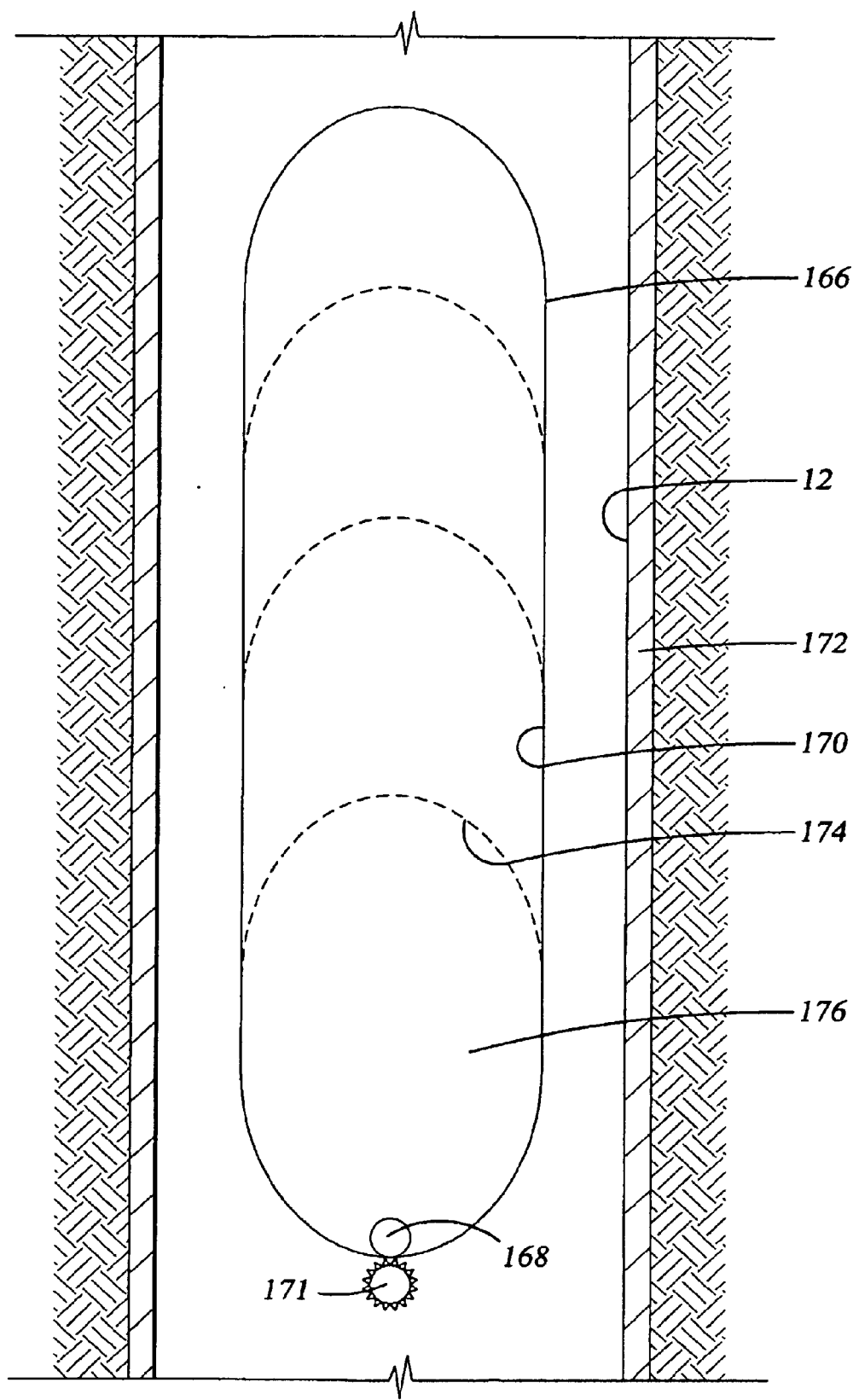
FIG. 9 is a cross-sectional elevation view of the window being cut in the existing cased borehole of FIG. 8.

Referring now to FIGS. 8 and 9, the composite umbilical 20 may be used with a bottom hole assembly 150 for cutting a sidetrack window in an existing cased borehole to drill a new borehole into a bypassed hydrocarbon zone. FIG. 1 illustrates a well for the use of bottom hole assembly 150 to remove a section of the existing casing to allow exit of propulsion system 120, for drilling the new borehole 12.

Referring now to FIG. 8, bottom hole assembly 150 is connected to the downstream end of composite umbilical 20 by release tool 80. The bottom hole assembly 150 includes a power section 90, a transmission 100, an electronics section 110, and a downhole umbilical window cutting assembly 160. It should be appreciated that the bottom hole assembly 150 does not include a bit and may not require power section 90. The electronics section 110 is still useful in transmitting data to the surface on downhole parameters such as temperature and pressure.

Cutting assembly 160 includes an upstream transaction module 102 and a downstream traction module 104. Propulsion system 160 includes a template 164 mounted on hydraulically actuated pistons 165, 167 disposed in housing 163 for moving template 164 between an extended position in contact with the wall of cased borehole 14 and a retracted position adjacent housing 163 as shown in FIG. 8.

It should be appreciated that depending upon the application and the well, a propulsion system may or may not be required with bottom hole assembly 150. If self-propulsion is not required, traction modules 102, 104 would merely be used to provide a stable platform for the cutting operation of the window. The expanded traction modules 102, 104 provide an absolute stabilized platform for setting the template 164 and then cutting around the template 164 in a preferred shape for the window 170.

As best shown in FIG. 9, template 164 has a perimeter 166 in the predetermined shape of window 170 to be cut in the wall 172 of cased borehole 14. One or more jet nozzles 168 are mounted on the end of a flexible hose providing jets of water mixed with a gas such as nitrogen or carbon dioxide supplied from the surface. It should be appreciated that the cutting method of the present invention is not be limited to fluid. For example, a high temperature cutting apparatus or other method may be used. Nozzle 168 is mounted on a track 169 having a rotating gear 171 for moving nozzle 168 in a spiral motion on housing 160 and along a spiral path 174 adjacent the perimeter 166 of template 164 to cut the window 170 in the wall 172 of casing 14. Nozzle 168 may be powered either hydraulically or electrically alone the track 169 in a spiral fashion, such as path 174, to cleanly cut the window along its perimeter 166 by cutting multiple parts 176 of the cased borehole 14 inside the template 170. The parts 176 of casing 12 are then removed magnetically by electro-magnets 178 disposed on housing 163.

In operation, bottom hole assembly 150 is moved into position adjacent the location for the window 170. Traction modules 102, 104 are expanded into engagement with the wall 172 of casing 12 thus providing a stable platform for the cutting of window 170. The hydraulic pistons 165, 167 on housing 163 are actuated to move the template 164 against the inside of wall 172 of casing 12. The template 164 is maintained in position by the pressure applied thereto by hydraulic pistons 165, 167. Gears 171 mounted on the track 169 of housing 160 are actuated electrically and fluid mixed with gas is pumped from the surface through composite umbilical 20 and through jet nozzle 168. As the gears 171 move nozzle 168 in a spiral fashion along track 169 and inside the template 164, parts 176 of casing 172 are cut free and are retracted by electro-magnets 178. Once the nozzles 168 have completed cutting all of the parts 176 of casing 12 to form the window, traction modules 102, 104 are released and the bottom hole assembly 150 is retrieved from the cased borehole 14. The result is a cleanly cut window of uniform shape as shown in FIG. 9.

Although bottom hole assembly 150 has been described using a water frozen by a gas for cutting the window 170, it should be appreciated that bottom hole assembly 150 may be fitted with other means for cutting the window 170 such as explosive charges, chemical nozzles, or ice using nitrogen or other gas or liquid. Other means include percussion drilling, an acetylene torch, or arcing.

Referring now to FIG. 10, after the bottom hole assembly 150 has been removed from the well 14, a tubular member 180, having a seal flange 182 with the shape and dimensions of the window 170, is mounted on bottom hole assembly 150, or like assembly, and run into the borehole 14. Upon positioning assembly 150 adjacent the window, and after expanding traction modules 102, 104 into engagement with the wall 172 of the casing 14, the hydraulic actuators, similar to actuators 165, 167, are actuated to properly orient the tubular member 180 and pass the tubular member 180 into the window 170. The seal flange 182 is then abutted around the periphery 166 to form a seal around the window 170 in casing 14. The seal flange 182 provides a mechanical sealed junction 184 at the window 170 for receiving a bottom hole assembly, such as bottom hole assembly 30, for drilling new borehole 12. Upon completing the drilling of the new borehole 12, a production string may be lowered through the tubular member 180 and seal flange 182 and into the new borehole 12.

Alternatively, a completion string may be run into the borehole 12 and through the bore of tubular member 180. The casing can then be cemented in the new borehole 12. The new casing in the new borehole 12 keeps the new borehole 12 open, allow for subsequent treatments of the formation and to prevent the borehole from collapsing during production. It should be appreciated that if a quick production of the bypassed formation is desired, the upper end of the casing may project into the cased borehole and an external casing packer set around the upper end to seal off the existing cased borehole 14. Frequently the production from the existing pay zones and the bypassed pay zones are commingled above the external casing packer and pass up the cased borehole to the surface.

It is possible to use composite umbilical 20 as the production string in the new borehole 12. Composite umbilical 20 can be tied back to the external casing packer or sealed at the casing exit point and extend to the surface.

Utilizing bottom hole assembly 150 allows the drilling system 10 to trip into the borehole 14 and retract from the borehole 14 quickly. One objective of the drilling system 10 of the present invention is to produce the bypassed formations quickly and economically because of their limited producing life.

It should also be appreciated that composite umbilical 20 may be used for perforating the well. For example, after bottom hole assembly 150 has been removed from the well 12 and the well has been cased, a perforation joint may be attached to the downhole end of composite umbilical 20 and run down into the new borehole 12. The perforation joint can then be detonated to perforate the borehole 12 for production. The composite umbilical 20 can then be used as production tubing. Screens can also be run on the downstream end of composite umbilical 20.

Another application of the bottom hole assembly of the present invention is testing while drilling. The bottom hole assembly is lowered into the well and located adjacent the formation to be tested. The upper and lower traction modules on the bottom hole assembly are used to isolate the production zone in the cased borehole. The data is then gathered and processed, typically for testing formation pressures. Often samples are collected for retrieval to the surface. The bottom hole assembly must be especially rugged to withstand the extremely harsh drilling environment.

The downhole umbilical propulsion system of the present invention may include other applications. These include the conveyance of conventional logging tools and the pulling of casing or a completion string into the borehole, as for example.

Figure 12:
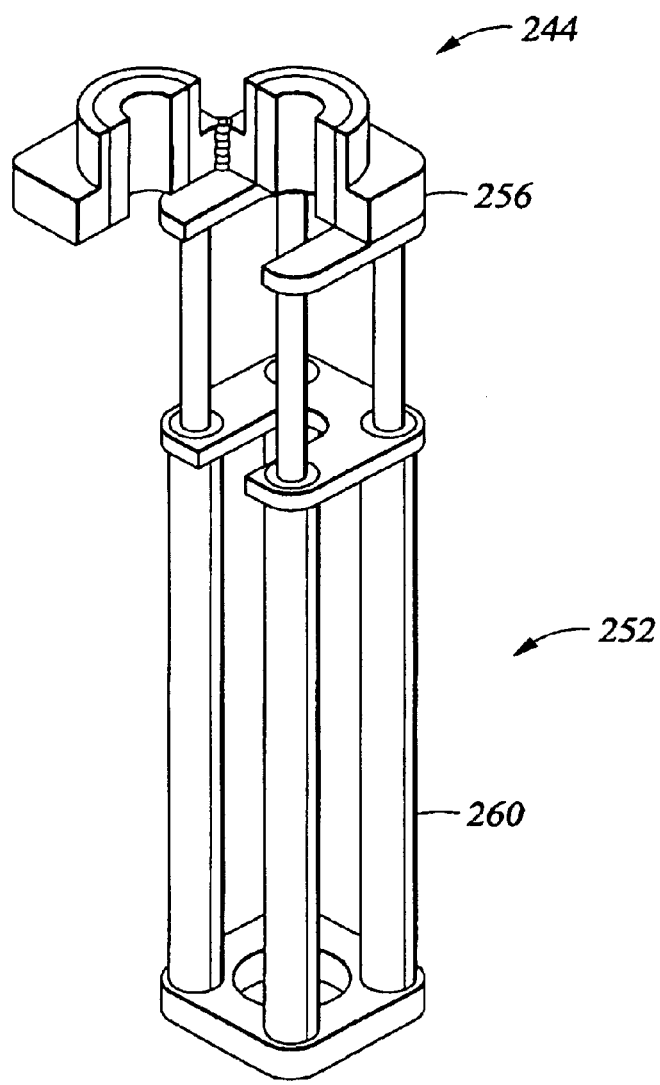
FIG. 12 is an exploded view of a casing ram for deploying and retrieving a joint of casing into the new borehole.

Referring now to FIGS. 11 and 12, it is still preferred to use steel for casing the new borehole. Steel has a greater absolute tensile and compressive strength and is more elastic than present day composite tubing. Also, steel is able to withstand the temperature gradients within the producing well as well as other environmental conditions that exist in the producing well. Steel casing is also able to withstand the many sheer forces of a producing well. Therefore, the drilling system 10 preferably uses the bottom hole assemblies on composite umbilical 20 for drilling the borehole and then steel casing is lowered into the new borehole for completing the well.

Since it is the objective of the drilling assembly 10 of the present invention to eliminate the requirement of a rig, a completion assembly 240 is shown in FIGS. 11 and 12 which requires no rig. Completion assembly 240 includes a pipe handling system 242, a casing elevator 244, casing tongs 246, and casing rams 250. The pipe handling system 242 picks up individual casing joints in the horizontal position shown at 248 and then moves individual casing joints into an intermediate position at 252 and then to an upright position 253. The new joint is then positioned horizontally over the wellhead 254. In the vertical position over wellhead 254, the hydraulically controlled casing elevator 244 grabs the new joint of pipe for alignment with the upper end of the casing string projecting from wellhead 254. Tongs 246 are mounted on the frame of hydraulic casing rams 240 for threading the new casing joint onto the upper end of the casing string in the borehole.

Referring now to FIG. 12, the casing rams 250 support the casing elevator 244 by means of a top bowl 256 and a bottom bowl 258. Bowls 256, 258 include slips for suspending the casing string. The casing string passes through the slips in bowls 256, 258 which support and grab the casing. The casing rams include four rams 260 for pushing downwardly on the new casing joint and casing string and thus into the new borehole. One type of casing rams are manufactured by R. L. Gilstrap Co. of Oklahoma City. See "The Wellhead CasingJac for Extra Pipe Pulling Power" by R. L. Gilstrap Co., incorporated herein by reference. After the new joint of pipe is threadingly connected to the casing string, it is jacked into the borehole using the hydraulic casing jacks 252. The completion system 240 also includes conventional cementing of the new casing in the well.

The completion system 240 has several advantages over the prior art. As can be seen, no rig is required for installing the casing string in the new borehole. Further, the completion system 240 may be operated by as few as two men. Also, the casing rams 250 have the ability to pull the casing out of the well and have sufficient power to overcome the friction and drag of the casing against the cased borehole. Further, the casing rams 250 have the ability to push the casing string into the well. Conventional rigs do not have such an ability and rely upon the weight of the casing using gravity and or rotation or reciprocating to install the casing string in the well.

It should be appreciated that the present invention may be used with a conventional rig or may include the reduced use of a conventional drilling rig. For example, an operator use a conventional rig to drill boreholes for the conductor casing and then release the rig for use on other wells.

While a preferred embodiment of the invention has been shown and described, modifications thereof can be made by one skilled in the art without departing from the spirit of the invention.

What is claimed is:

1. A system for conveying a well apparatus through a borehole in a well, the borehole having a sidewall and an axis, the system comprising:
- a composite tube having a liner with a flow bore to circulate fluids in the well and fibers engineered to cause said composite tube to withstand axial and yield stresses placed on said composite tube;
- a conductor disposed in a wall of the composite tube; and
- a propulsion system attached downhole to said composite tube and to the well apparatus, said propulsion system being powered by the fluids circulating through said composite tube, said propulsion system engaging the borehole sidewall to propel the well apparatus along the borehole axis within the well.

2. The system of claim 1 wherein said composite tube is made of materials such that said fluids around said composite tube cause said composite tube to achieve substantially neutral buoyancy within the well.

3. The system of claim 1 wherein said composite tube includes an axial component of the modulus of elasticity having Young's modulus in the range of 500,000 to 10,500,000 psi.

4. The system of claim 1 wherein said composite tube has a material with a density in the range of from 0.99 grams per cubic centimeter to 2.9 grams per cubic centimeter achieving substantially neutral buoyancy in said fluids.

5. The system of claim 1 wherein said conductor is an electrical power conductor embedded non-axially in said composite tube.

6. The system of claim 1 further including an electrical conductor and a data transmission conductor housed adjacent said fibers of said composite tube.

7. The system of claim 1 further including passages for conveying fluid pressure and conductors for conducting electricity and data, said passages and conductors being disposed adjacent said fibers.

8. The system of claim 1 wherein said propulsion system includes an aperture therethrough extending around an axis of the propulsion system and from an upstream end to a downstream end for the flow of fluid through said propulsion system.

9. The system of claim 1 wherein said composite tube includes load carrying layers of fibers and a wear layer disposed around said load carrying layers.

10. The system of claim 9 wherein said wear layer is braided around said load carrying layers.

11. The system of claim 9 further including a pressure layer around said load carrying layers.

12. The system of claim 1 wherein said propulsion system is powered by the fluids circulated through said flow bore and up an annulus formed by the composite tube.

13. The system of claim 1 wherein said propulsion system includes a housing with traction modules for alternating engaging the borehole to propel a bit for drilling a borehole in the well.

14. A system for conveying a well apparatus in a well, comprising:
- a composite tube having a liner with a flow bore to circulate fluids in the well and fibers engineered to cause said composite tube to withstand axial and yield stresses placed on said composite tube;
- a conductor disposed in a wall of the composite tube;
- a propulsion system attached downhole to said composite tube and to the well apparatus, said propulsion system being powered by the fluids circulating through said composite tube to propel the well apparatus within the well; and
- wherein said composite tube is made of a fiber reinforced matrix forming a modulus which is non-linear.

15. An apparatus for performing operations downhole in a well, the well having a borehole with a sidewall and an axis, the apparatus comprising;
- a string of tubular members each having a liner with a flow bore to circulate fluids with fibers forming a composite tube engineered to cause said composite tube to withstand axial and yield stresses placed on said composite tube, said fibers forming a wall of non-metallic fibers having an axial component of modulus of elasticity greater than 500,000 psi;
- a bottom hole assembly attached downhole to said string;
- said bottom hole assembly including a propulsion system engaging the borehole sidewall to propel said bottom hole assembly along the borehole axis in the well, said propulsion system being powered by the fluids circulating through said composite tube to propel the bottom hole assembly within the well; and
- a power conductor disposed adjacent said fibers in said wall and spirally wound around said liner providing power to said bottom hole assembly.

16. The apparatus of claim 15 wherein said bottom hole assembly includes a non-drilling well apparatus.

17. The apparatus of claim 15 wherein said bottom hole assembly includes a bit connected to a three dimensional steering apparatus by an articulated joint to change a bend angle and angular orientation of the bend angle of said bit at said articulated joint.

18. The apparatus of claim 17 wherein said three dimensional steering apparatus includes a three dimensionally, angularly adjustable joint at said three dimensional steering apparatus.

19. The apparatus of claim 15 wherein said bottom hole assembly includes an electronics section and a propulsion system having a resistivity antenna, said resistivity antenna being connected to said electronics section for measuring the resistivity of the well.

20. The apparatus of claim 15 wherein said modulus of elasticity in the axial direction is in the range of 0.5 to 10.5 million psi and is not linear.

21. The apparatus of claim 15 wherein said modulus of elasticity in an axial direction is determined by dividing the yield strain into the yield stress required for said composite tube to be engineered for a particular well.

22. The apparatus of claim 15 wherein said modulus of elasticity in an axial direction is at least 1.43 million psi.

23. The apparatus of claim 15 wherein said wall has a yield strain, modulus of elasticity in an axial direction, and a yield stress, said modulus of elasticity in the axial direction being determined by dividing the yield strain into the yield stress required for said wall to be spoolable.

24. The apparatus of claim 15 wherein said tubular members have a density substantially the same as that of the wellbore fluids.

25. The apparatus of claim 24 for drilling a wellbore using drilling fluids having a specific gravity between 8.4 and 12.5 pounds per gallon, further including a propulsion system attached downhole to said string applying a pull force on said string between zero and 14,000 pounds depending upon the specific gravity of the drilling fluids.

26. An apparatus for performing operations downhole in a well comprising:
- a string of tubular members each having a liner with a flow bore to circulate fluids with fibers forming a composite tube engineered to cause said composite tube to withstand axial and yield stresses placed on said composite tube, said fibers forming a wall of non-metallic fibers having an axial component of modulus of elasticity greater than 500,000 psi;

a bottom hole assembly attached downhole to said string;

said bottom hole assembly including a propulsion system to propel said bottom hole assembly in the well, said propulsion system being powered by the fluids circulating through said composite tube to propel the bottom hole assembly within the well;

a power conductor disposed adjacent said fibers in said wall and spirally wound around said liner providing power to said bottom hole assembly; and wherein fibers are engineered to cause said string to achieve substantially neutral buoyancy in the fluids in the well.

27. An apparatus for performing operations downhole in a well comprising:

a string of tubular members each having a liner with a flow bore to circulate fluids with fibers wrapped in a predetermined pattern around said liner to carry axial load, said fibers forming a wall of non-metallic fibers having an axial component of modulus of elasticity greater than 500,000 psi;

a bottom hole assembly attached downhole to said string;

a power conductor disposed adjacent said fibers in said wall and spirally wound around said liner providing power to said bottom hole assembly; and said wall having a modulus of elasticity which is not linear and has a yield strain which allows said wall to withstand loads placed on said string of tubular members.

28. An apparatus for performing operations downhole in a well comprising:

a string of tubular members each having a liner with a flow bore to circulate fluids with fibers wrapped in a predetermined pattern around said liner to carry axial load, said fibers forming a wall of non-metallic fibers having an axial component of modulus of elasticity greater than 500,000 psi;

a bottom hole assembly attached downhole to said string;

a power conductor disposed adjacent said fibers in said wall and spirally wound around said liner providing power to said bottom hole assembly; and said wall having a yield strain which allows said tubular members sufficient bending to be spooled onto a spool; and said wall having a modulus of elasticity which is not the same in all axes.

29. The apparatus of claim 28 wherein said yield strain is at least 0.01818.

30. The apparatus of claim 28 wherein said wall has a modulus of elasticity in an axial direction and a yield stress, a yield strain being a ratio of said yield stress to said modulus of elasticity.

31. The apparatus of claim 30 wherein said yield stress is at least 26,000 psi.

32. A drilling system for drilling a borehole into a formation the borehole having a longitudinal axis, comprising:

a string of pipe having a portion thereof which is non-metallic with fibers wrapped about a conduit adapted for the flow of fluids, said fibers being engineered to cause said non-metallic portion to withstand axial and yield stresses placed on said non-metallic portion;

a bottom hole assembly attached to one end of the string and having a propulsion system and a member for displacing formation;

said bottom hole assembly having a flow passage therethrough adapted for the flow of fluids and a return passageway external of said bottom hole assembly adapted for the flow of fluids containing cuttings;

said propulsion system adapted to propel said bottom hole assembly longitudinally in the borehole, said propulsion system being powered by the fluids circulating through said conduit and bottom hole assembly to force said member longitudinally into the formation; and a power conductor disposed adjacent said fibers providing power to said bottom hole assembly.

33. The system of claim 32 wherein said wrapped fibers form composite tubes and further including a connector for connecting lengths of said composite tubes.

34. The drilling system of claim 33 wherein said connector includes:

a first end connector mounted on one composite tube;

a second end connector mounted on a second composite tube;

said end connectors having mating cooperative surfaces which engage upon mating said end connectors; and seals sealingly engaging upon the mating of said cooperative surfaces to provide a hydraulic seal around said power conductor.

35. The drill system of claim 33 further including:

first and second lengths of a composite tube, each length including an inner liner, a plurality of load carrying layers around said liner, at least one power conductor and at least one data transmission conductor extending said length between said load carrying layers;

first and second end connectors for disposition on said first and second lengths respectively, said end connectors having apertures for receiving one end of said liners, load carrying layers, power conductor and data transmission conductor;

said end connectors having conductor connectors for connecting said power conductors and said data transmission conductors;

said end connectors having interchangeable members connecting said end connectors; and seals sealingly engaging upon the mating of said cooperative surfaces to provide a hydraulic seal around said power conductor.

36. The system of claim 32 further including a steerable assembly having an actuator to adjust a bend angle between said formation displacing member and said bottom hole assembly and to adjust an angular orientation of the bend angle to alter the direction of the well path of said bottom hole assembly.

37. The system of claim 36 wherein said steerable assembly is actuated electrically to cause said formation displacing member to move three dimensionally with respect to said bottom hole assembly.

38. The apparatus of claim 36 wherein said steerable assembly includes a housing, a plurality of spacer members disposed in apertures azimuthally spaced around said housing, and a plurality of actuators mounted in said housing for individually actuating said spacer members into engagement with the borehole at different radial extents.

39. The system of claim 32 further including a power section driven by the circulating fluids and providing power to said bottom hole assembly.

40. The system of claim 32 wherein said non-metallic portion has load-carrying layers of fiber engineered to provide tensile strength to said string.

41. The drilling system of claim 32 wherein said bottom hole assembly has an axis with a central flow passage therethrough disposed about said axis.

42. The apparatus of claim 19 wherein said propulsion system includes a housing with an aperture receiving said resistivity antenna.

43. A system for drilling a borehole in a formation, comprising:
- a string of composite pipe extending into the borehole, said composite pipe including fibers wrapped in a predetermined pattern to carry axial load;
- a prime mover coupled to said pipe string;
- a drill bit at one end for drilling the borehole;
- said downhole motor engaged to said prime mover;
- said downhole motor rotating said drill bit:
- a steerable assembly connected to said prime mover; and
- said prime mover pulling said composite pipe and forcing said drill bit axially downstream within the borehole and into the formation.

44. A bottom hole assembly for controlling the drilling of a borehole from a control at the surface, comprising:
- a composite pipe extending into the borehole;
- said composite pipe having a data transmission conduit coupled to the control;
- a prime mover coupled to said pipe;
- a downhole motor for rotating an output shaft having an articulation joint allowing said output shaft to have a bend angle and an angular orientation of said bend angle, said output shaft operatively extending through a steerable assembly to rotate a drill bit;
- said steerable assembly sending signals through said data transmission conduit to the control and said steerable assembly receiving signals from the control;
- said steerable assembly having an actuator to adjust the bend angle and the angular orientation of the bend angle of the output shaft to direct said drill bit three dimensionally without rotation of said prime mover;
- said prime mover adapted to move said drill bit upstream or downstream within the borehole in response to said signals received by said steerable assembly.

45. A bottom hole assembly for use in drilling a borehole, comprising:
- a pipe attached at one end to the bottom hole assembly and having a communication link disposed within a wall of the pipe;
- a downhole motor;
- a drill bit;
- a propulsion system;
- an articulated joint forming a bend angle and an angular orientation of said bend angle and having a first portion connected to said downhole motor and a second portion coupled to said drill bit, said second portion connected to said first portion in a manner to permit said second portion to form said bend angle and said angular orientation; and
- a steerable assembly in engagement with said second portion, said steerable assembly being in communication with said communication link to adjust said bend angle and said angular orientation of said bend angle to alter said second portion three dimensionally with respect to said first portion upon command to change the direction of said drill bit.

46. The system of claim 45 wherein said steerable assembly includes at least one electrically actuated motor to cause said second portion to move three dimensionally.

47. The bottom hole assembly of claim 45 wherein said propulsion system is powered by circulation fluids passing through said pipe and bottom hole assembly.

48. A system for conveying a well apparatus in a well, comprising:
- a string of composite tubes with one or more conductors disposed in a wall thereof and a flow bore to circulate fluids downhole in the well;
- a propulsion system attached downhole to said string; said propulsion system being powered by the circulation fluids circulated through said flow bore and up an annulus formed by the composite tubes;
- said propulsion system applying a downstream force on said string pulling said string downhole; and
- said composite tubes having layers of fibers engineered to cause said composite tubes to withstand axial and yield stress placed on said string.

49. The system of claim 48 further including a power section providing power to a drill member utilizing the circulation fluids.

50. The system of claim 49 wherein said propulsion system and power section are powered by the circulation fluids supplied through said string.

51. The system of claim 48 wherein said composite tubes have a material with a density in the range of from 0.99 grams per cubic centimeter to 2.9 grams per cubic centimeter.

52. The system of claim 48 wherein said composite tubes are made of a fiber reinforced matrix.

53. The system of claim 48 further including a connector for connecting lengths of said composite tubes.

54. The system of claim 48 further including a three dimensional steering apparatus having a universal joint and an actuator for adjusting a bend angle and angular orientation of said bend angle of said universal joint.

55. The system of claim 48 further including a drill member and a steerable assembly adjusting a bend angle and angular orientation of said bend angle between said drill member and steerable assembly for controlling the direction of said drill member.

56. The system of claim 48 further including:
- a drill bit connected to a downhole motor by an articulated joint, said articulated joint having a first portion connected to said downhole motor and a second portion coupled to said drill bit, said second portion connected to said first portion in a manner to permit said second portion to have a bend angle and an angular orientation of said bend angle with respect to said first portion; and
- a steerable assembly in engagement with said second portion, said steerable assembly being in communication with said communication link to alter said bend angle and said angular orientation of said second portion with respect to said first portion upon command to change the direction and/or angle of inclination of said drill bit.

* * * * *